US012602291B2

(12) United States Patent
Vankamamidi et al.

(10) Patent No.: US 12,602,291 B2
(45) Date of Patent: *Apr. 14, 2026

(54) SELECTING CANDIDATES FOR DEMOTION FROM A FIRST ASYNCHRONOUS REPLICATION TECHNIQUE TO A SECOND ASYNCHRONOUS REPLICATION TECHNIQUE

(71) Applicant: Dell Products L.P., Hopkinton, MA (US)

(72) Inventors: Vamsi K. Vankamamidi, Hopkinton, MA (US); Mayank Ajmera, Cary, NC (US); Socheavy D. Heng, Framingham, MA (US); Vikram A. Prabhakar, Apex, NC (US)

(73) Assignee: Dell Products L.P., Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/735,868

(22) Filed: Jun. 6, 2024

(65) Prior Publication Data

US 2025/0377980 A1     Dec. 11, 2025

(51) Int. Cl.
*G06F 16/00* (2019.01)
*G06F 11/1446* (2026.01)
*G06F 16/27* (2019.01)

(52) U.S. Cl.
CPC .......... *G06F 11/1458* (2013.01); *G06F 16/27* (2019.01); *G06F 16/273* (2019.01); *G06F 16/275* (2019.01)

(58) Field of Classification Search
CPC .... G06F 11/1458; G06F 16/27; G06F 16/273; G06F 16/275

(Continued)

(56) References Cited

U.S. PATENT DOCUMENTS

2019/0102269 A1     4/2019  Abouelwafa et al.
2019/0354286 A1*   11/2019  Jung ....................... G06F 3/061
(Continued)

OTHER PUBLICATIONS

U.S. Appl. No. 18/361,399, filed Jul. 28, 2023, entitled Managing Transient Snapshots for Reduced Metadata Writes, Vamsi K. Vankamamidi, et al.

(Continued)

*Primary Examiner* — Monica M Pyo
(74) *Attorney, Agent, or Firm* — BainwoodHuang

(57)     ABSTRACT

Techniques can include: configuring stretched volumes to perform asynchronous replication in a first mode using a first replication technique that uses a write tracking cache to track locations that are written between successive replication-related snapshots of respective source volumes of the stretched volumes; performing asynchronous replication for the stretched volumes in accordance with the first replication technique; and monitoring resource consumption of the write tracking cache during asynchronous replication processing using the first replication technique, wherein said monitoring includes: determining that a current amount of write tracking cache consumed exceeds a high watermark threshold; and responsive to determining that the current amount of write tracking cache consumed exceeds a high watermark threshold, selecting, in accordance with criteria, one or more of the stretched volumes for demotion from the first replication mode to a second replication mode that uses a second replication technique that does not use the write tracking cache.

20 Claims, 16 Drawing Sheets

(58) Field of Classification Search
USPC ......................................................... 707/613
See application file for complete search history.

(56) References Cited

U.S. PATENT DOCUMENTS

| 2021/0073089 | A1* | 3/2021 | Sathavalli | ........... | G06F 9/45558 |
| 2023/0333777 | A1* | 10/2023 | Shveidel | ............... | G06F 3/0619 |
| 2024/0143554 | A1 | 5/2024 | Kaushik et al. | | |
| 2024/0232020 | A1* | 7/2024 | Shveidel | ............. | G06F 16/1844 |
| 2024/0256123 | A1 | 8/2024 | Moore et al. | | |

OTHER PUBLICATIONS

U.S. Appl. No. 18/401,916, filed Jan. 2, 2024, entitled Tracking Writes and Snapshot Creation/Deletion in Memory To Improve Asynchronous Replication Performance and Support Lower Recovery Point Objectives (RPOS), David Bernard, et al.
U.S. Appl. No. 18/641,996, filed Apr. 22, 2024, entitled Techniques for Dynamic Resource Balancing With Asynchronous Replication, Mayank Ajmera, et al.

* cited by examiner

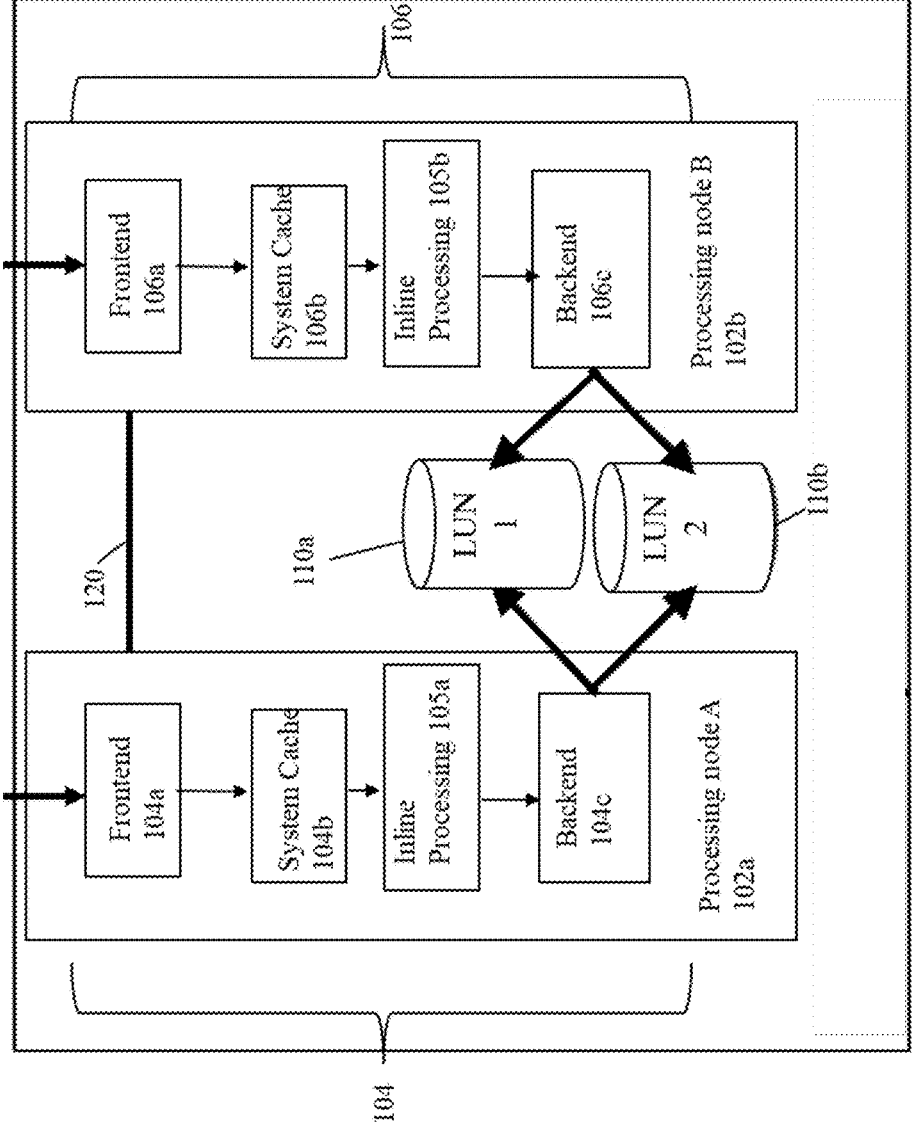
FIG. 2A

400

Tracking ID=ID1

LBA A (e.g., W1 302b)

LBA B (e.g., W2 302c)

Tracking ID=ID2

LBA C (e.g., W3, 302e)

LBA D (e.g., W4, 302f)

410

420

410a
410b 420a
420b

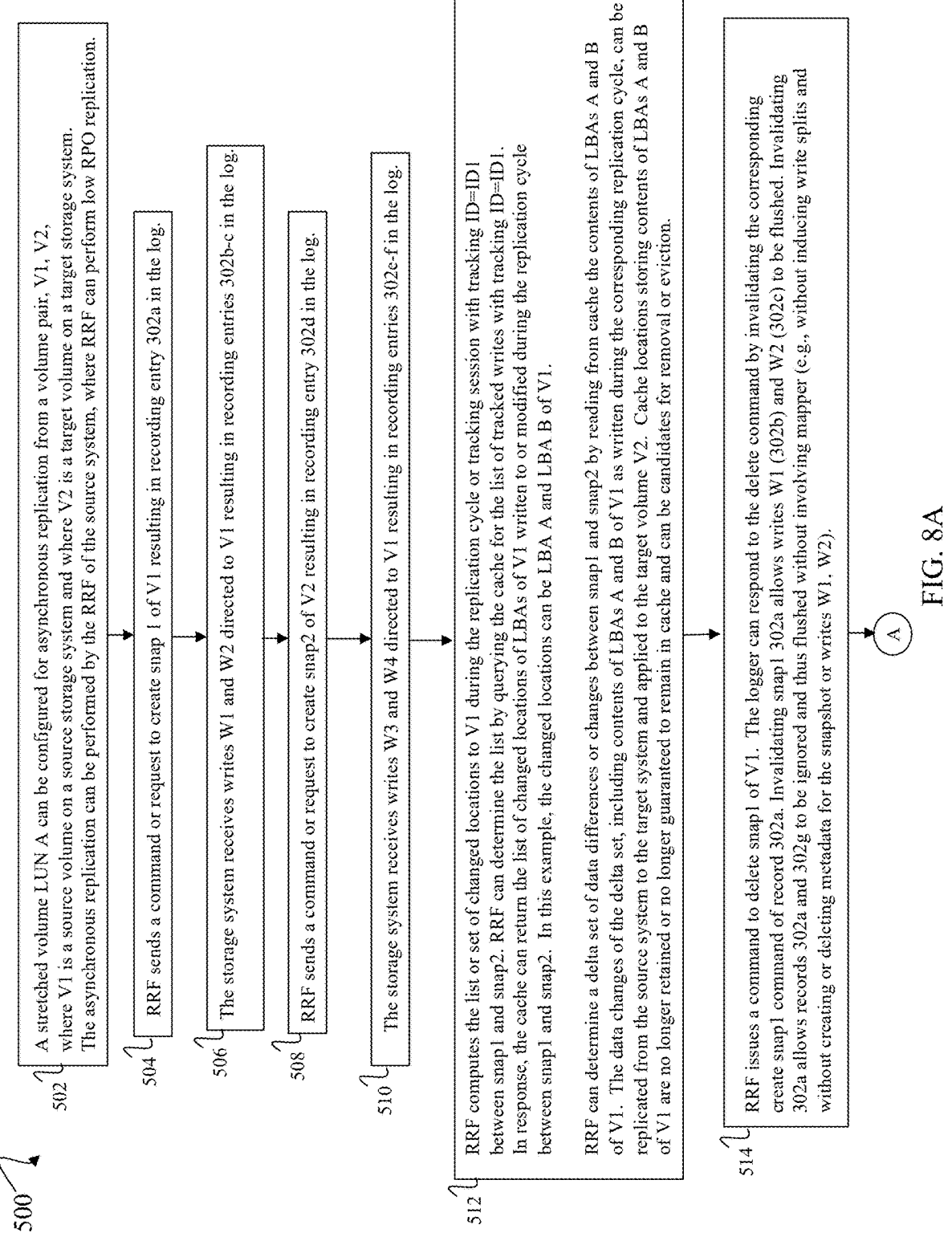

502 — A stretched volume LUN A can be configured for asynchronous replication from a volume pair, V1, V2, where V1 is a source volume on a source storage system and where V2 is a target volume on a target storage system. The asynchronous replication can be performed by the RRF of the source system, where RRF can perform low RPO replication.

504 — RRF sends a command or request to create snap 1 of V1 resulting in recording entry 302a in the log.

506 — The storage system receives writes W1 and W2 directed to V1 resulting in recording entries 302b-c in the log.

508 — RRF sends a command or request to create snap2 of V2 resulting in recording entry 302d in the log.

510 — The storage system receives writes W3 and W4 directed to V1 resulting in recording entries 302e-f in the log.

512 — RRF computes the list or set of changed locations to V1 during the replication cycle or tracking session with tracking ID=ID1 between snap1 and snap2. RRF can determine the list by querying the cache for the list of tracked writes with tracking ID=ID1. In response, the cache can return the list of changed locations of LBAs of V1 written to or modified during the replication cycle between snap1 and snap2. In this example, the changed locations can be LBA A and LBA B of V1.

RRF can determine a delta set of data differences or changes between snap1 and snap2 by reading from cache the contents of LBAs A and B of V1. The data changes of the delta set, including contents of LBAs A and B of V1 as written during the corresponding replication cycle, can be replicated from the source system to the target system and applied to the target volume V2. Cache locations storing contents of LBAs A and B of V1 are no longer retained or no longer guaranteed to remain in cache and can be candidates for removal or eviction.

514 — RRF issues a command to delete snap1 of V1. The logger can respond to the delete command by invalidating the corresponding create snap1 command of record 302a. Invalidating snap1 302a allows writes W1 (302b) and W2 (302c) to be flushed. Invalidating 302a allows records 302a and 302g to be ignored and thus flushed without involving mapper (e.g., without inducing write splits and without creating or deleting metadata for the snapshot or writes W1, W2).

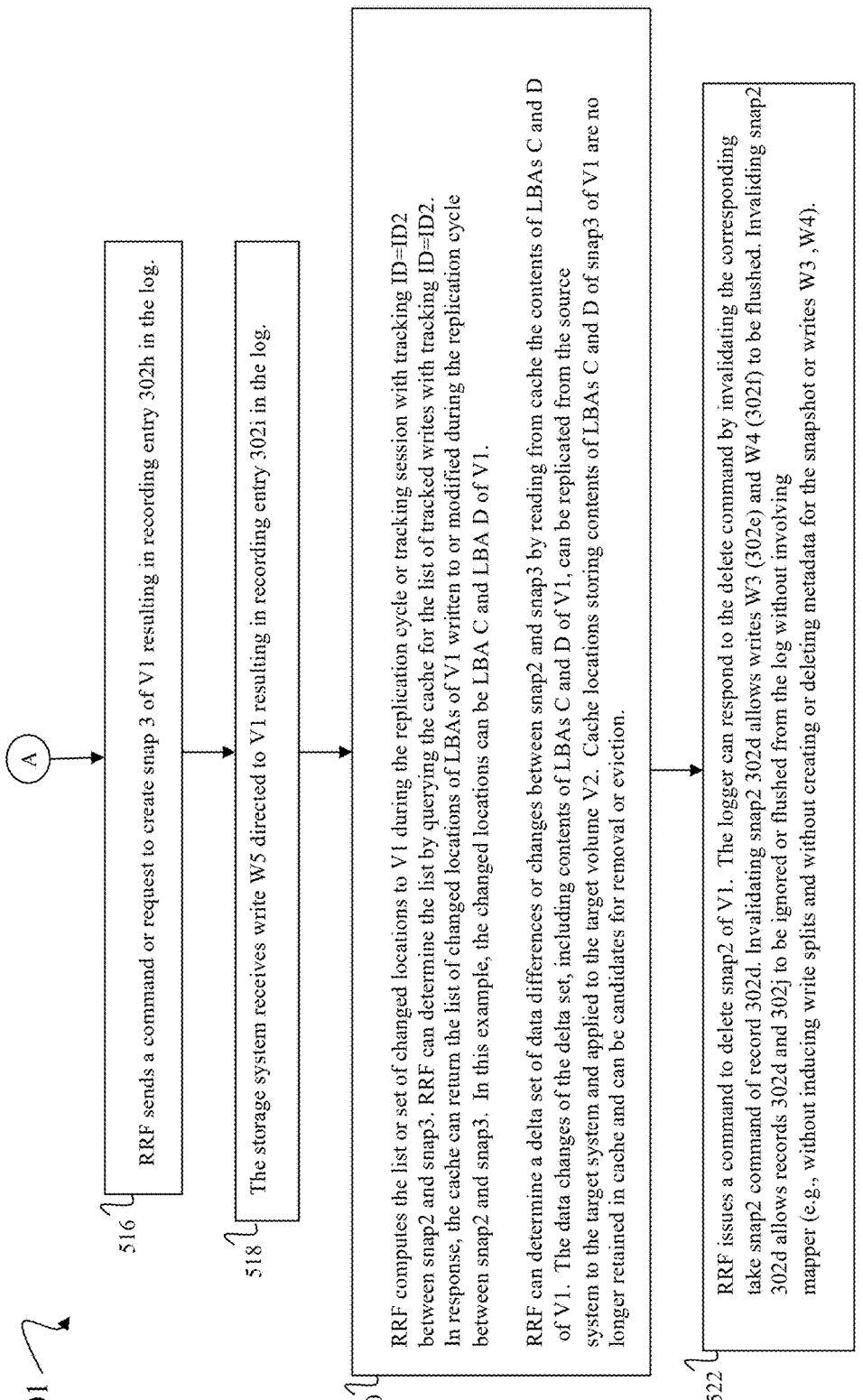

501

A

516 — RRF sends a command or request to create snap 3 of V1 resulting in recording entry 302h in the log.

518 — The storage system receives write W5 directed to V1 resulting in recording entry 302i in the log.

520 — RRF computes the list or set of changed locations to V1 during the replication cycle or tracking session with tracking ID=ID2 between snap2 and snap3. RRF can determine the list by querying the cache for the list of tracked writes with tracking ID=ID2. In response, the cache can return the list of changed locations of LBAs of V1 written to or modified during the replication cycle between snap2 and snap3. In this example, the changed locations can be LBA C and LBA D of V1.

RRF can determine a delta set of data differences or changes between snap2 and snap3 by reading from cache the contents of LBAs C and D of V1. The data changes of the delta set, including contents of LBAs C and D of V1, can be replicated from the source system to the target system and applied to the target volume V2. Cache locations storing contents of LBAs C and D of snap3 of V1 are no longer retained in cache and can be candidates for removal or eviction.

522 — RRF issues a command to delete snap2 of V1. The logger can respond to the delete command by invalidating the corresponding take snap2 command of record 302d. Invalidating snap2 302d allows writes W3 (302e) and W4 (302f) to be flushed. Invaliding snap2 302d allows records 302d and 302j to be ignored or flushed from the log without involving mapper (e.g., without inducing write splits and without creating or deleting metadata for the snapshot or writes W3, W4).

FIG. 8B

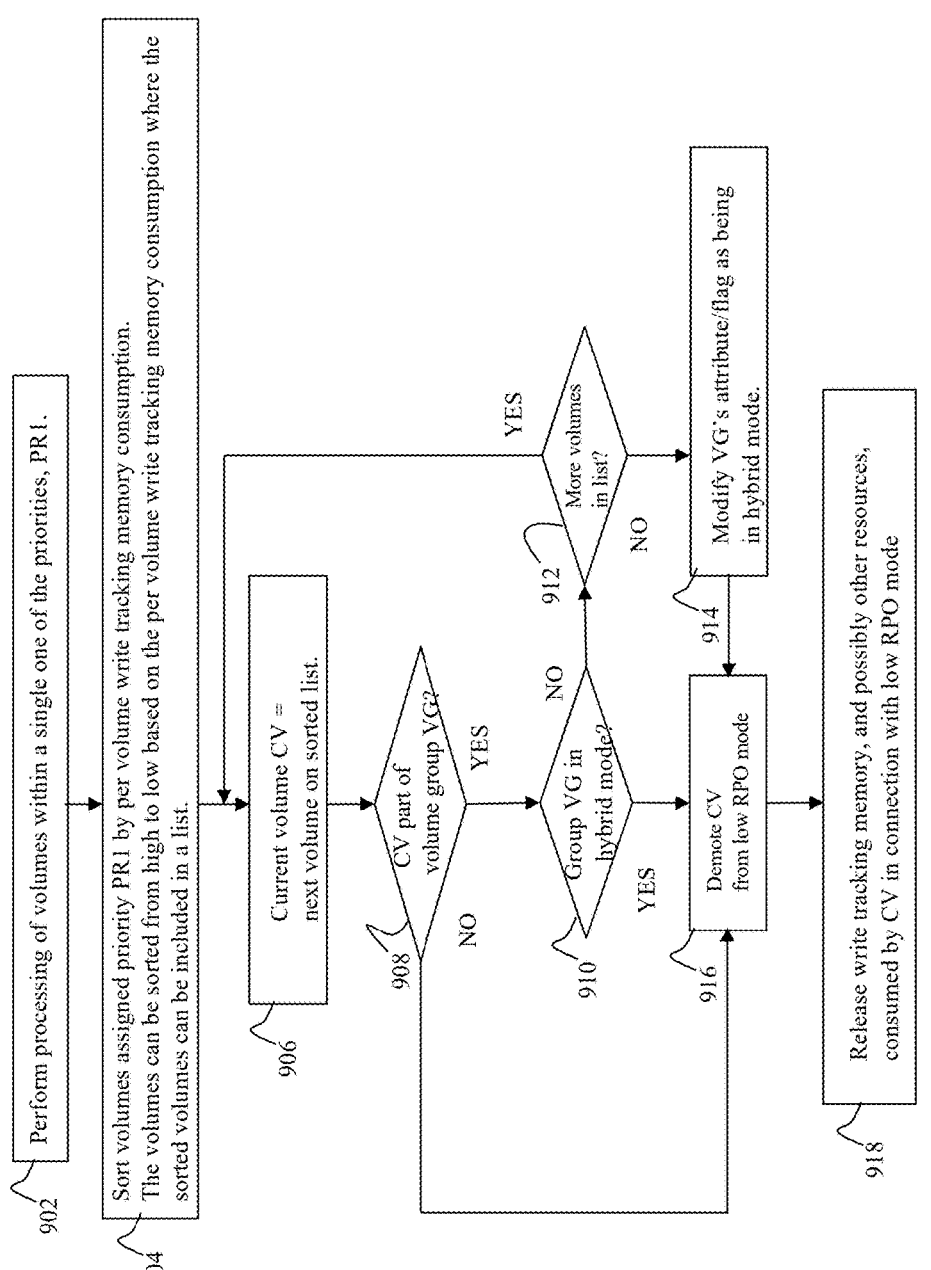

902 Perform processing of volumes within a single one of the priorities, PR1.

904 Sort volumes assigned priority PR1 by per volume write tracking memory consumption. The volumes can be sorted from high to low based on the per volume write tracking memory consumption where the sorted volumes can be included in a list.

906 Current volume CV = next volume on sorted list.

908 CV part of volume group VG?

NO

YES

910 Group VG in hybrid mode?

NO

YES

912 More volumes in list?

YES

NO

914 Modify VG's attribute/flag as being in hybrid mode.

916 Demote CV from low RPO mode

918 Release write tracking memory, and possibly other resources, consumed by CV in connection with low RPO mode

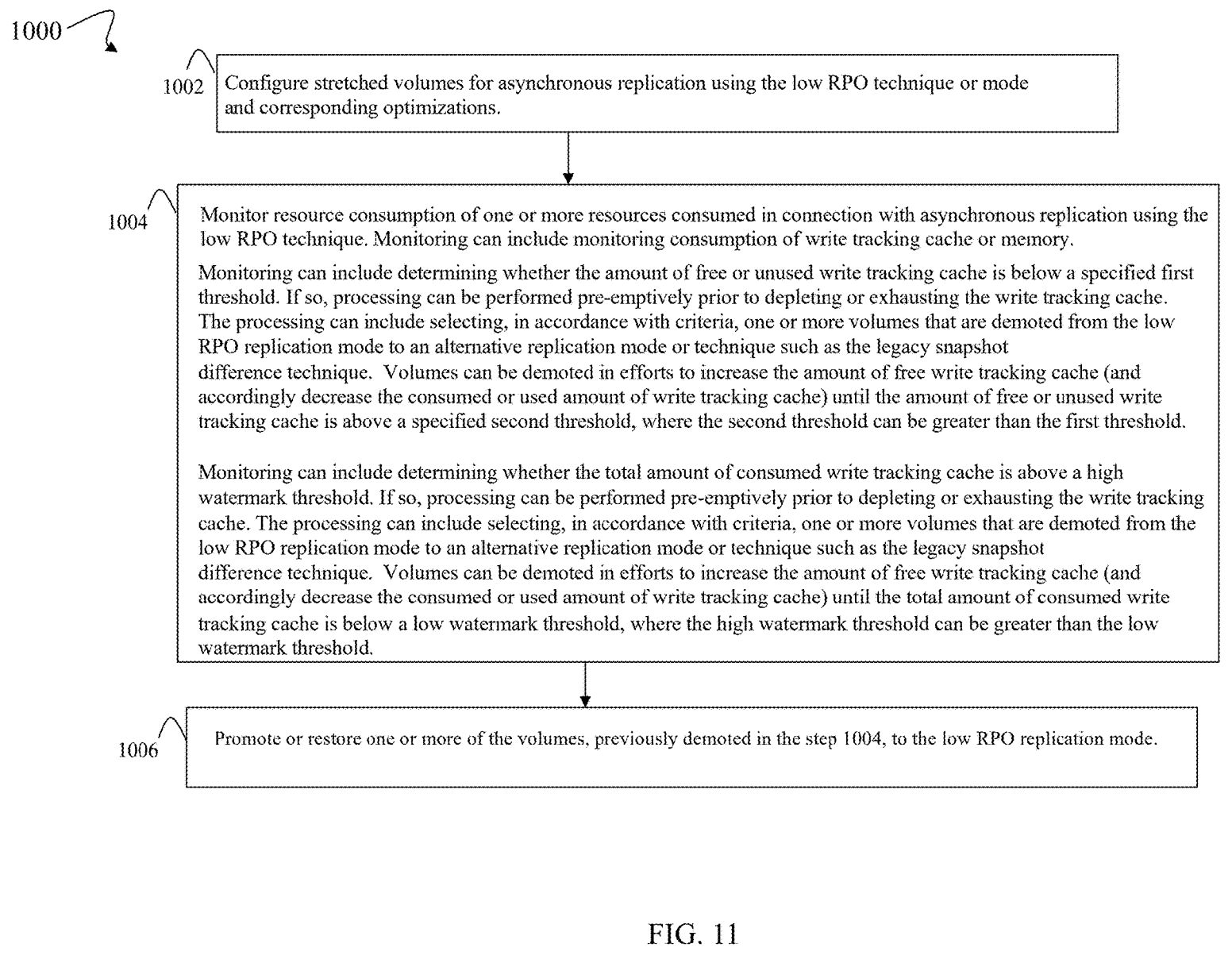

1002 — Configure stretched volumes for asynchronous replication using the low RPO technique or mode and corresponding optimizations.

1004 — Monitor resource consumption of one or more resources consumed in connection with asynchronous replication using the low RPO technique. Monitoring can include monitoring consumption of write tracking cache or memory.

Monitoring can include determining whether the amount of free or unused write tracking cache is below a specified first threshold. If so, processing can be performed pre-emptively prior to depleting or exhausting the write tracking cache. The processing can include selecting, in accordance with criteria, one or more volumes that are demoted from the low RPO replication mode to an alternative replication mode or technique such as the legacy snapshot difference technique. Volumes can be demoted in efforts to increase the amount of free write tracking cache (and accordingly decrease the consumed or used amount of write tracking cache) until the amount of free or unused write tracking cache is above a specified second threshold, where the second threshold can be greater than the first threshold.

Monitoring can include determining whether the total amount of consumed write tracking cache is above a high watermark threshold. If so, processing can be performed pre-emptively prior to depleting or exhausting the write tracking cache. The processing can include selecting, in accordance with criteria, one or more volumes that are demoted from the low RPO replication mode to an alternative replication mode or technique such as the legacy snapshot difference technique. Volumes can be demoted in efforts to increase the amount of free write tracking cache (and accordingly decrease the consumed or used amount of write tracking cache) until the total amount of consumed write tracking cache is below a low watermark threshold, where the high watermark threshold can be greater than the low watermark threshold.

1006 — Promote or restore one or more of the volumes, previously demoted in the step 1004, to the low RPO replication mode.

FIG. 11

SELECTING CANDIDATES FOR DEMOTION FROM A FIRST ASYNCHRONOUS REPLICATION TECHNIQUE TO A SECOND ASYNCHRONOUS REPLICATION TECHNIQUE

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: configuring a plurality of stretched volumes for asynchronous replication, wherein each of the plurality of stretched volumes is configured from a source volume on a source system and a target volume on a target system, and where writes or data changes to the source volume are asynchronously replicated from the source system to the target system and applied to the target volume, wherein said configuring includes configuring the plurality of stretched volumes to perform asynchronous replication in a first mode using a first replication technique that performs one or more optimizations including a first optimization that uses a write tracking cache of the source system to track locations of each of the plurality of stretched volumes that are written between successive replication-related snapshots of respective source volumes of the plurality of stretched volumes; performing asynchronous replication for the plurality of stretched volumes in accordance with the first replication technique; and monitoring resource consumption of the write tracking cache consumed during asynchronous replication processing in connection with the first replication technique, wherein said monitoring includes: determining that a current amount of write tracking cache consumed exceeds a high watermark threshold; and responsive to determining that the current amount of write tracking cache consumed exceeds a high watermark threshold, performing first processing that selects, in accordance with criteria, one or more of the plurality of stretched volumes for demotion from the first replication mode, that uses the first replication technique, to a second replication mode that uses a second replication technique, wherein the second replication technique does not perform the first optimization and does not use the write tracking cache.

In at least one embodiment, monitoring can include demoting selected ones of the plurality of stretched volumes from the first replication mode, that uses the first replication technique, to the second replication mode, that uses the second replication technique, until the current amount of write tracking consumed is below a low watermark threshold, wherein the low watermark threshold is less than the high watermark threshold.

In at least one embodiment, the criteria can include a set of priorities, and processing can include assigning each of the plurality of stretched volumes a corresponding priority of the set. The set of priorities includes three priorities. The criteria can include, for each of the plurality of stretched volumes, a corresponding indicator as to whether said each stretched volume is a member of a volume group. The criteria can include, for each of the plurality of stretched volumes, a corresponding amount of the write tracking cache consumed in connection with performing asynchronous replication for said each stretched volume using the first replication technique of the first replication mode.

In at least one embodiment, the first processing can include partitioning said plurality of stretched volumes into priority groups based on a respective one of the priorities of the set assigned to each of said plurality of stretched volumes, wherein the priorities of the set are ranked, from a highest priority level to a lowest priority level, and wherein each of the priority groups associated with a respective one of the priorities of the set includes a corresponding portion of the plurality of stretched volumes assigned said one priority. For each of the plurality of priority groups, first processing can include sorting respective stretched volumes of said each priority group based on corresponding amounts of the write tracking cache consumed per stretched volume in connection with performing asynchronous replication using the first replication technique of the first replication mode, wherein said sorting can generate, for said each priority group, a list of said each priority group's stretched volumes sorted based on decreasing respective amounts of the write tracking cache consumed in connection with performing asynchronous replication using the first replication technique of the first replication mode.

In at least one embodiment, the first processing can include evaluating said plurality of stretched volumes as candidates for demotion based, at least in part, on increasing priority levels associated with the priority groups. The set of priorities can include a first priority associated with a first group of the priority groups, wherein the first group includes a first list of stretched volumes that are i) assigned the first priority, and ii) sorted based on decreasing respective amounts of the write tracking cache consumed per stretched volume in connection with performing asynchronous replication using the first replication technique of the first replication mode. First processing can include evaluating stretched volumes for demotion from the first replication mode based on the sorted order of the first list. The step of evaluating can include: determining a current volume as a next stretched volume of the first list; determining whether the current volume is included in any volume group; and responsive to determining that the current volume does not belong to any volume group, performing second processing including: demoting the current volume from the first replication mode to the second replication mode; and releasing a corresponding portion of the write tracking cache consumed in connection with the first replication mode for the current volume.

In at least one embodiment, the step of evaluating can include: responsive to determining that the current volume belongs to a first volume group that is in hybrid mode, performing third processing including: demoting the current volume from the first replication mode to the second replication mode; and releasing a corresponding portion of the write tracking cache consumed in connection with the first replication mode for the current volume.

In at least one embodiment, the step of evaluating can include: responsive to determining that the current volume belongs to a second volume group that is not in hybrid mode, determining whether there is at least one remaining stretched volume on the first list that has not been evaluated; and responsive to determining that the current volume belongs to the second volume group that is not in hybrid mode and that there is at least one remaining stretched volume on the first list that has not been evaluated for demotion, performing fourth processing including: determining not to demote the current volume; and evaluating a next stretched volume of the first list for demotion.

In at least one embodiment, the step of evaluating can include: responsive to determining that the second volume group is not in hybrid mode and that there are no remaining stretched volumes on the first list to be evaluated for demotion, performing fifth processing including: demoting the current volume from the first replication mode to the second replication mode; and releasing a corresponding portion of the write tracking cache consumed in connection with the first replication mode for the current volume.

In at least one embodiment, the second replication technique can be a legacy snapshot difference technique.

BRIEF DESCRIPTION OF THE DRAWINGS

Features and advantages of the present disclosure will become more apparent from the following detailed description of exemplary embodiments thereof taken in conjunction with the accompanying drawings in which:

FIG. 2A is an example illustrating the I/O path or data path in connection with processing data in an embodiment in accordance with the techniques of the present disclosure.

FIGS. 8A, 8B, 9, 10 and 11 are processing steps flowcharts that can be performed in at least one embodiment in accordance with the techniques of the present disclosure.

DETAILED DESCRIPTION OF EMBODIMENT(S)

Figure 1:
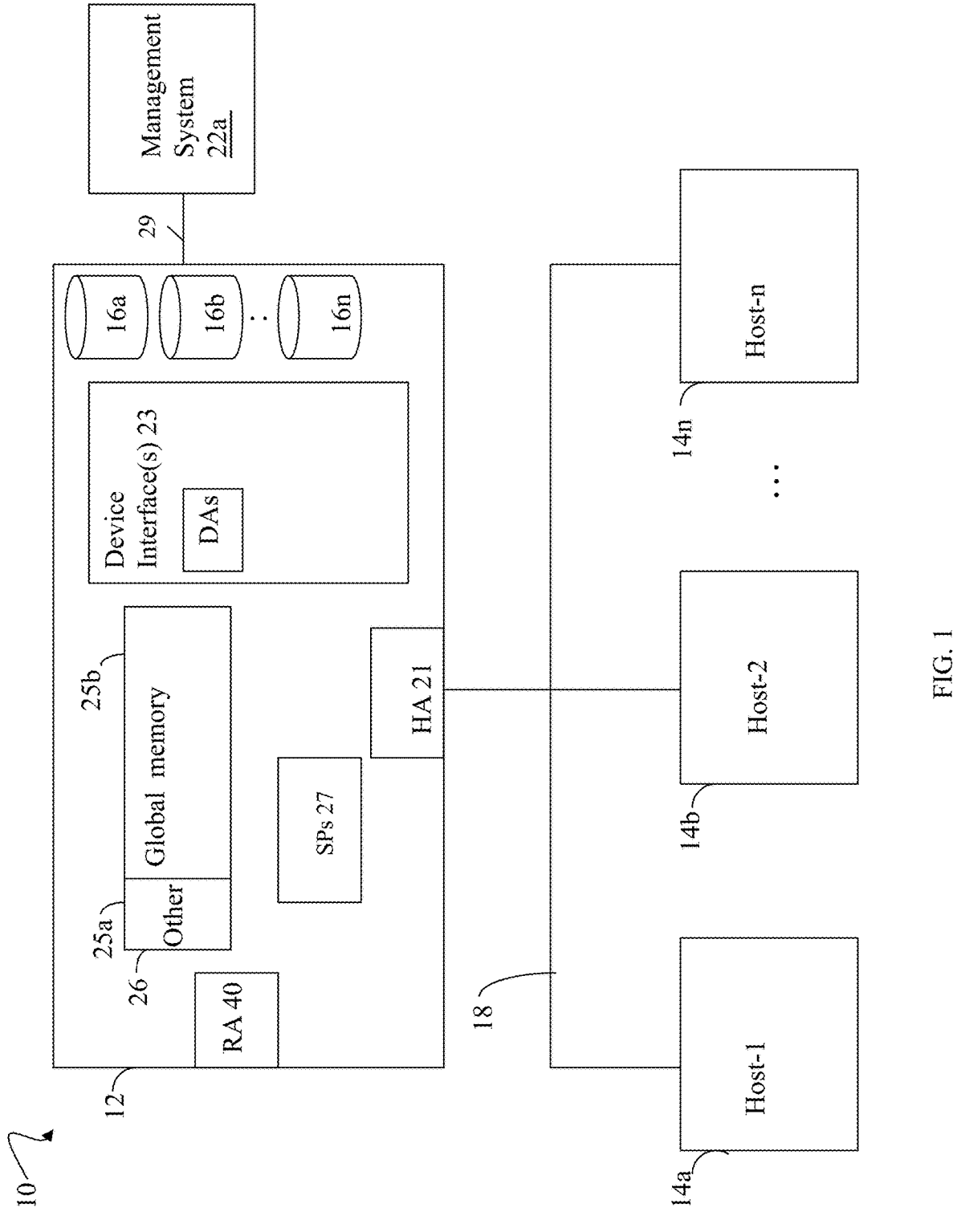
FIG. 1 is an example of components that can be included in a system in accordance with the techniques of the present disclosure.

Data storage systems can perform different data services such as remote data replication (also referred to as remote replication). Generally remote replication provides for replicating data from a source system to a remote target system. For example, data on the source system can be a primary copy of a storage object which is remotely replicated to a counterpart remote target storage object on the remote target system. The remote storage target object can be used, for example, in the event that the primary copy or source data storage system experiences a disaster where the primary copy is unavailable. Generally, remote replication can be used for any suitable purpose to increase overall system reliability and data availability. Remote data replication can be performed in a continuous ongoing manner where data changes or writes made to a source object on the source system over time can be automatically replicated to a corresponding remote target storage object on the remote target system.

The source storage system and the target storage system can present a single data storage resource or object, such as a volume or logical device, to a client, such as a host. The volume or other storage resource or object can be configured as a stretched volume or resource, where both the source storage object of the source system and the target storage object of the target system are configured to have the same identity from the perspective of the external host. Thus the stretched volume or resource configured from a pair of volumes or resources, such as the source storage object of the source storage system and the target storage object of the target storage system, can be configured for remote replication that can be further characterized as one-way replication where, as noted above, writes to the source storage object are automatically replicated in a continuous ongoing manner to the target storage object. The stretched volume, resource or object can be exposed over paths going to both the source storage system and the target storage system, but where the host can only issue I/Os to the stretched volume over paths to the source storage system but not the target storage system.

One mode or methodology of one-way remote replication can be referred to as asynchronous remote replication (sometimes referred to as asynchronous replication) where a recovery point objective or RPO is specified. The RPO for a particular asynchronous remote replication configuration or session can be defined as the maximum amount of allowable data loss, as measured by time, that can be lost after a recovery from a disaster, failure, or comparable event before data loss will exceed what is acceptable to an organization. Put another way, the RPO indicates how far behind in terms of time the remote or target storage object on the target system is allowed to be with respect to the source or primary copy of the storage object on the source system. Thus, with asynchronous replication configured for a source storage object and a remote or target storage object, the remote or target storage object and the source storage object can denote different point in time copies. The source storage object denotes the most up to date version of the storage object and the remote or target storage object denotes an earlier or prior version of the storage object than the source storage object. The RPO can be specified at a time granularity that can range typically, for example, from hours to a number of minutes.

In at least one existing system, asynchronous replication can capture data changes or differences to be copied from the source storage object to the target storage object in repeated cycles using a snapshot difference technique. A snapshot of a storage object such as a volume or logical device can be defined as a point in time version of the storage object, where the snapshot captures the state of the storage object, such as with respect to the current content of the storage object, when the snapshot is taken. The snapshot difference technique can be utilized where the source system continually takes successive snapshots of the source storage object at a specified defined rate or frequency based on the defined RPO. The snapshots can sometimes be referred to as transient snapshots or replication related snapshots in that they are used only internally in the source system for asynchronous replication purposes. The source system can determine a difference in content between the current snapshot N of the source storage object and the immediately prior snapshot N−1 of the source storage object, where the data changes replicated to the target system correspond to the difference in content between the snapshots N and N−1 of the source storage object. Thus, the difference in content between each pair of successive snapshots can denote the set of data changes or writes that is replicated from the snapshot N of the source object to the target storage object of the target system. Generally, as the RPO gets smaller, the frequency or rate at which snapshots are taken and differences determined using the snapshot difference technique increases. In at least one version of the snapshot difference technique (sometimes referred to as the legacy version), resource intensive processing can be performed that includes creating the two successive snapshots N−1 and N, and then subsequently deleting the two snapshots in a very short time period solely for the purposes of replication. Thus, for very small RPOs that can be desired, taking replication related snapshots at a high rate or frequency and repeatedly using the snapshot difference technique to determine each set or cycle of data changes replicated can be inefficient and have an adverse effects including excessive overhead costs.

It can be desirable to support specifying an even smaller time granularity for an RPO such as less than a minute or a number of seconds. It can further be desirable to provide for efficient asynchronous replication resulting in a low RPO that is a number of seconds or generally less than a minute.

Accordingly, a more efficient asynchronous replication technique or mode sometimes referred to as a low RPO replication technique or a near-zero (NZ) replication technique can be used in at least one embodiment. Additionally in at least one embodiment, the low RPO replication technique or mode can perform various optimizations that provide for efficient asynchronous replication of a configured stretched storage object from a corresponding source storage object or volume of a source system and a corresponding target storage object or volume of a target system. In at least one embodiment, the techniques of the present disclosure can further provide for monitoring resource consumption in connection with performing low RPO replication for volumes configured for low RPO asynchronous replication. In at least one embodiment, the resource monitored and consumed in connection with the low RPO replication technique or mode can include memory or cache consumed in connection with tracking writes made to the volume since the last replication related snapshot of the volume was taken. In at least one embodiment, one optimization of the low RPO replication technique can include tracking, in cache or memory, the changed locations written to between successive replication related snapshots. Responsive to determining that the amount of cache consumed for such write tracking exceeds a first threshold, the techniques of the present disclosure in at least one embodiment can include pre-emptively demoting one or more volumes, that are configured for asynchronous replication using the low RPO replication technique or mode, to utilize a second alternative asynchronous replication technique. In at least one embodiment, the second alternative asynchronous replication technique can be a legacy snapshot difference or snap diff technique that does not use cache for tracking writes made to a configured volume between consecutive replication-related snapshots taken of the volume for determining the data difference to be copied or migrated from the source to the target. Thus performing asynchronous replication using the second alternative replication technique or mode for the selected one or more volumes can result in an overall reduction in the amount of cache consumed for write tracking (of the low RPO replication mode) by other remaining volumes performing asynchronous replication using the low RPO replication mode or technique. In at least one embodiment, once the amount of cache consumed for write tracking decreases such as to fall below a specified threshold, at least some of the one or more selected volumes operating using the second alternative asynchronous replication technique can be promoted so as to restore or resume performing asynchronous replication using the low RPO replication mode or technique.

In at least one embodiment, the low RPO replication technique or mode described herein provides for asynchronous replication that results in a near zero RPO or more generally a very low RPO or low RPO. For configured stretched volumes that perform asynchronous replication using the low RPO replication technique, multiple optimizations can be performed in connection with asynchronous replication that provide for achieving the very low RPO. One of the optimizations provides for tracking writes and keeping a record in cache of such writes made to a volume between successive snapshots. In at least one embodiment, the low RPO replication technique can also perform additional optimizations all of which can be dependent on the write tracking being performed where such the particular addresses or locations of the writes made to the volume between successive replication-related snapshots are tracked in cache. Put another way in at least one embodiment, performing such write tracking and storing the tracked writes in cache can be a prerequisite or requirement for performing any other optimization of the low RPO replication technique. Thus in at least one embodiment, if the write tracking memory consumed collectively across all volumes configured for asynchronous replication using the low RPO technique becomes consumed or exhausted, the system is unable to perform the low RPO replication technique for any configured volume. In order to prevent exhaustion or depletion of the write tracking memory resource used for low RPO replication, in at least one embodiment processing can be performed to proactively or pre-emptively demote one or more volumes configured for asynchronous replication using the low RPO replication technique to a second alternative asynchronous replication technique that does not utilize the write tracking memory resource.

In at least one embodiment, demotion of volumes from the low RPO replication technique or mode to the second alternative asynchronous replication technique can be triggered when the total amount of write tracking memory consumed by the low RPO replication technique across all configured volumes exceeds a high water mark threshold. Once demoting is triggered, in at least one embodiment, the number of volumes as well as the particular volumes selected for demotion can be based, at least in part, on the total amount of write tracking memory consumed falling below a specified low water mark threshold. In at least one embodiment the high water mark threshold can be larger than the low water mark threshold. In at least one embodiment, processing can be performed to continue to demote eligible candidate volumes until the total amount of write tracking memory consumed falls below the specified low watermark threshold.

In at least one embodiment, the one or more volumes selected for demotion can be based, at least in part, on a priority assigned to each volume configured for asynchronous replication using the low RPO replication technique. In at least one embodiment, each volume can be assigned one of a predefined set of multiple priorities. In at least one embodiment, the priority assigned to each volume can be a user-specified or assigned priority from the set of multiple priorities.

In at least one embodiment, the one or more volumes selected for demotion can be based, at least in part, on whether a volume is a member of a volume group. In at least one embodiment, the one or more volumes selected for demotion can be based, at least in part, on whether the volume is a member of a volume group currently in a hybrid or mixed mode where at least one volume of the volume group currently has asynchronous replication performed using the low RPO replication technique and at least one other volume of the volume group currently has asynchronous replication performed using a second alternative replication technique such as the legacy snapshot difference or snap diff technique.

In at least one embodiment, the particular one or more volumes selected for demotion can be based, at least in part, on the amount of write tracking memory consumed in connection with tracking writes to each volume configured for asynchronous replication using the low RPO replication technique.

In at least one embodiment, the one or more volumes selected can be based on any one or more of: a priority assigned to each volume; whether a volume is a member of a volume group; whether a volume is a member of a volume group that is currently operating as a hybrid or mixed group with members having asynchronous replication performed using the low RPO replication technique and a second alternative asynchronous replication technique; and an amount of the write tracking memory or cache currently consumed in connection with performing asynchronous replication using the low RPO replication technique for each volume.

In at least one embodiment, an asynchronous replication session operating using the low RPO replication technique can provide for efficient asynchronous replication for a stretched storage object that results in a very small RPO that is on the scale of a number of seconds or generally less than a minute. For example in at least one embodiment, the RPO can be less than 30 seconds and, as noted above, can sometimes be referred to herein as "near zero" or low RPO replication using a "near zero" RPO due to the very small RPO. With near zero or low RPO replication in at least one embodiment, snapshots can be taken in a continuous ongoing manner such that when the data changes of a current replication cycle have been replicated or copied from the source to the target system, the source system can take a next snapshot of the source storage object and then replicate the data changes of the next replication cycle to the target system. The foregoing can be performed in an ongoing manner in at least one embodiment. In at least one embodiment, rather than taking replication related snapshots at a frequency based on a defined RPO value or setting, the near zero or low RPO replication can perform asynchronous replication by continually taking snapshots of the source storage object in an ongoing manner and then replicating data changes of the latest replication cycle. A replication cycle can occur between two successive replication related snapshots of a source volume where the writes made to the source volume between the time period when the two successive snapshots are taken are included in the replication cycle. Thus with near zero or low RPO replication for a stretched storage object in at least one embodiment, once the current replication cycle of data changes is copied or replicated from the source system to the target system, the source system can immediately commence the next replication cycle without regard to taking snapshots at a defined frequency.

In at least one embodiment, a replication related snapshot can denote a snapshot taken for replication related purposes such as for asynchronous replication using the near zero or low RPO replication technique described herein. In at least one embodiment, replication related snapshots can be used internally by the source storage system to capture data changes that are copied or replicated in ongoing replication cycles to the target system for a stretched storage object or resource.

In at least one embodiment, the low RPO or near zero replication as discussed in more detail below can provide a low RPO by utilizing limited or finite resources of the storage system, where such resources can include cache resources and the log resources. In at least one embodiment, writes and other operations can be recorded in a persisted log and also in a volatile memory cache. Once the write or other operation has been recorded in the persisted log, an acknowledgement regarding completion of the operation can be returned to the client that sent the operation. In times of heavy system workload such as high I/O workload periods with respect to stretched volumes or storage objects configured for low RPO replication, there can be contention and increased demand for the cache and log resources. As the I/O load on the stretched volumes or storage objects configured for low RPO replication increases, the free or available amounts of the resources, such as the log and cache resources, can fall to undesirable low levels below specified corresponding minimum thresholds. As a result, the system can be unable to sustain the low RPO targets for all such stretched volumes configured for low RPO replication causing, for example, at least several of the stretched volumes to have increased corresponding measured or observed RPOs above specified maximum compliant RPO targets or thresholds.

In at least one embodiment, based on resource consumption such as consumption of cache or memory consumed for write tracking using the low RPO replication technique, the techniques of the present disclosure can proactively and dynamically adjust and select the number stretched volumes selected for demotion from the low RPO replication technique or mode to a second alternative asynchronous replication mode or technique. In at least one embodiment, demotion of such one or more selected volumes can be performed pre-emptively and proactively prior to depleting or exhausting the write tracking memory available and allocated for use with the low RPO replication technique across configured volumes. Such demotion can be performed for selected stretched volumes in efforts to maintain RPO compliance using the low RPO replication technique for a maximum number of stretched volumes. When resource consumption and pressure increases during periods of high I/O workload, stretched volumes operating with asynchronous replication using the low RPO replication technique or mode can be configured to operate with asynchronous replication performed using an alternative technique or mode that does not consume the write tracking memory or cache that is utilized and consumed with the low RPO replication technique. When resource consumption and pressure decreases from periods of a high I/O workload to a lower I/O workload such that the write tracking cache consumption decreases, stretched volumes operating with asynchronous replication using the alternative technique or mode can be promoted and reconfigured to resume operating with asynchronous replication using the low RPO replication technique or mode.

In at least one embodiment of the present disclosure, a low RPO or near zero RPO replication technique can perform multiple optimizations including: write tracking where tracked write locations between successive replication related snapshots are stored in write tracking cache or memory; using transient snapshots or snaps that can be retained in the log without flushing until deleted from the log; and holding or maintaining data to be replicated in a cache of the source system until the data has been asynchronously replicated to the target system.

In at least one embodiment, the low RPO replication technique of the present disclosure can determine data changes or writes that are replicated in a replication cycle without performing the expensive snapshot difference technique such as noted above where the snapshots are actually flushed from the log and created such as by a mapper component discussed elsewhere herein. In at least one embodiment using the low RPO replication technique, a cache or caching layer can perform write tracking of tagged writes where the cache can identify all writes tagged with a particular tracking identifier (ID). The particular tracking ID can uniquely identify tracked writes of a particular replication cycle between two successive snapshots of a source volume. All writes tracked with the particular tracking ID can denote the data changes in the replication cycle for a particular source volume. Thus in at least one embodiment, the above-noted write tracking can be used with the low RPO replication technique to determine corresponding locations in the source volume of the data changes to be replicated to the target system, where such tracked write locations are stored in the write tracking cache or memory. Thus such tracked data changes of the source storage object on the source system can denote source volume locations or offsets of written or changed data that is replicated from the source to the remote target system in a single replication cycle and then applied to the corresponding target storage object.

In at least one embodiment, the low RPO replication techniques of the present disclosure can include retaining the changed or written data (to be replicated in connection with asynchronous replication for the stretched storage object) in the cache of the source system until the changed or written data has been replicated from the source to the target system. In at least one embodiment, the changed or written data can remain in the source system's cache until the source system receives an acknowledgement from the target system that the changed data has been successfully received and committed.

In at least one embodiment, the low RPO replication techniques of the present disclosure can utilize a mechanism for write tracking of write I/Os in the data path where a cache or caching layer, such as a transactional caching layer, can track tagged write I/Os (e.g., tagged with a tracking ID). In at least one embodiment with the low RPO replication technique or mode where the stretched object is a stretched volume, the cache or caching layer of the source storage system can track metadata or information about the tagged write I/Os directed to the stretched object (and thus a corresponding source storage object), where the information can include a volume, offset (e.g., logical block address or LBA), and length corresponding to each tracked write I/O. The volume, offset and length can correspond to a target address or location of the write I/O to which data or content is written by the write I/O. At a later point in time in at least one embodiment, the information or metadata regarding tracked writes having a particular tracking ID can be requested and collected. The collected information or metadata for the particular tracking ID can describe, for example, the offsets or locations corresponding to the data changes or writes included in a particular replication cycle for the source storage object. In at least one embodiment, the collected information regarding tracked writes can be stored in the write tracking cache or memory.

In at least one embodiment of the low RPO replication technique or mode, the data changes or differences between two successive replication related snapshots N−1 and N of the source object can be identified by the tracked writes having a particular tracking ID. In at least one embodiment, data changes corresponding to successive snapshots of the source object can be identified by tracked writes directed to the source object, where such tracked writes can be tagged with corresponding tracking IDs uniquely associated with corresponding replication cycles.

In at least one embodiment for a stretched volume configured for low RPO replication that is one way asynchronous replication from a volume pair V1, V2, where V1 is the source volume on the source system and V2 is the target volume on the target system, the caching layer on the source system can track tagged write I/Os directed to the stretched volume, and thus V1, on the source system in connection with replication related snapshots for near zero or low RPO replication. In at least one embodiment of the low RPO technique, the tracked writes can denote a list of changed offsets or locations of V1 modified between successively taken replication-related snapshots of V1. The tracked writes can be stored as a list in a portion of a volatile memory cache of the source system. Low RPO replication techniques can then use the list of tracked writes as stored in cache (e.g., the write tracking cache) to identify the content to be replicated from the source system to the target system without having to use a more resource intensive technique. Additionally in at least one embodiment, retaining the content or data of the tracked writes in cache until such content or data has been replicated allows the low RPO replication technique to efficiently retrieve the content or data to be replicated from cache, as opposed to the more costly and time consuming processing of reading the data or content to be replicated from backend (BE) non-volatile storage.

Thus in at least one embodiment, the low RPO technique can store the list of tracked writes in cache where the list identifies logical addresses of the content to be replicated. In at least one embodiment, the low RPO technique can traverse the list of tracked writes to identify logical addresses or locations of V1 to be replicated, where the content or data of such logical addresses or locations can also be retrieved efficiently from cache without incurring the expensive processing of a read cache miss.

In at least one embodiment in accordance with the techniques of the present disclosure, the low RPO techniques can further utilize transient snapshots that are successively and continuously taken replication related snapshots. In low RPO replication, replication related snapshots can be created and deleted in a relatively short amount of time. In at least one embodiment, a snapshot request corresponding to a request to create a replication related snapshot of the source volume V1 can be received at the source system. In at least one embodiment, a log on the source system can be used to record, in time order, write I/Os of V1 and other operations such as commands to create and delete snapshots including replication related snapshots of V1. In such an embodiment, a record denoting the replication related snapshot creation or request can be recorded in the log having a relative position or location with respect to recorded writes that are included in the particular snapshot. Thus the log can include records in a time ordered sequence denoting the order in which recorded operations are received and applied.

In at least one embodiment, the low RPO replication techniques can provide for retaining in the log replication related snapshot commands that create transient snapshots without flushing them from the log until deleted from the log. In at least one embodiment, transient snapshots can be created and delete by a replication service that performs the low RPO replication techniques. In this manner, the replication service can create a transient snapshot and then delete the transient snapshot when the service is done using the transient snapshot for its replication purposes. In at least one embodiment, the record of the log denoting the request to create or take the replication related snapshot can be marked as transient indicating that the particular snapshot created is a replication related or transient snapshot. In at least one embodiment of the low RPO replication technique, a transient flag or indicator of a log record for a create snapshot command can indicate that the log records corresponding to the snapshot and the snapshot's (dirty) write data be retained in the log and not flushed from the log until the snapshot has been deleted, as denoted by an entry recorded in the log for the delete snapshot operation. In at least one embodiment, once the low RPO technique has replicated content or write data of write I/Os received between successive transient snapshots N−1 and N from the source system to the target system, the log record of the transient snapshot N−1 can be deleted and the log records of write I/Os between transient snapshots N−1 and N can be flushed from the log. In at least one embodiment of the low RPO replication technique, the foregoing of retaining records for the transient snapshot in the log until deleted can be performed, for example, rather than incur additional performance penalties associated with flushing records of the transient snapshot creation and subsequent write I/Os from the log, and then performing processing to delete the transient snapshot after it has been flushed from the log and created.

In at least one embodiment, flushing records of the transient snapshot from the log can be an expensive operation and can include creating and storing corresponding metadata for the transient snapshot. Furthermore, subsequent flushed writes to the source volume occurring after taking the transient snapshot of the source volume can also result in write splits causing additional metadata updates. In at least one embodiment, deleting the flushed transient snapshot can be an expensive operation in that the corresponding metadata for the snapshot is deleted and/or updated. Furthermore, processing can also be performed to undo any previously performed operations in connection with the write splits. In at least one embodiment, a write split can be performed with respect to a metadata page and includes allocating a new metadata page where the content of an existing metadata page is copied to the new metadata page. In connection with taking a snapshot of a source volume, the source volume and the snapshot include the same content initially and can thus share one or more same metadata pages. Subsequently, writes can be applied to the source volume resulting in differences in stored content of the source volume and snapshot. As a result of the writes, a write split can be performed where, prior to the writes, the snapshot and the source volume may share the same metadata page. Subsequent to applying the writes such as to the source volume, a first metadata page that is shared by both the snapshot and the source volume may be modified to reflect the writes applied to the source volume. However, prior to modifying the existing first metadata page for use with the source volume writes, a write split operation can be performed to preserve or duplicate the existing first metadata page content in a new page for use with the snapshot. Thus in at least one embodiment in connection with the low RPO replication technique, retaining a transient snapshot in the log (e.g., retaining in the log a record to create a transient snapshot) until deleted can avoid expensive processing, such as write splits noted above, that can be associated with a flushed transient snapshot.

In at least one embodiment, dirty write data can generally be retained in cache until the BE non-volatile storage has been updated to persistently store the write data, whereby the write data can now be characterized as clean and can be a candidate for eviction from the cache. As may be needed in at least one embodiment, records of the transient snapshot can be flushed from the log such as, for example, if there is an insufficient amount of log space and/or cache. However in at least one embodiment using the low RPO replication technique, even though write data of the transient snapshot may be flushed from the log, write data can be retained in, and not evicted from, the cache even after being flushed from the log and characterized as clean.

In at least one embodiment, log records, such as records of transient snapshots and writes recorded in the persistent log, can also be stored in a volatile memory cache. While recorded writes of the log remain in the log, the write data can remain in the cache as dirty data that has not yet been flushed. Such dirty write data can be retained in the cache and may not be a candidate for removal or eviction. In at least one embodiment as part of normal processing in the data path, once the corresponding log records of the write data have been flushed from the log, the write data of the write cache can be marked as clean, where clean data of the cache can be a candidate for removal or eviction. In at least one embodiment of low RPO replication, even if write data is flushed from the log, the write data can be retained in the cache of the source system until replicated to the target system.

In at least one embodiment, low RPO replication with respect to a stretched volume or resource can denote one way asynchronous replication from a source volume of a source system to a corresponding target volume of a target system. In at least one embodiment, low RPO replication for a stretched volume can replicate source volume data changes to the target system continuously such that as soon as one replication cycle ends, the next replication cycle begins. With low RPO replication in at least one embodiment, the cache can track tagged writes that are tagged with a tracking ID, and can store the list of tagged writes in cache. In at least one embodiment, tracking writes can include recording in cache information about the tagged writes such as volume, offset and length corresponding to the writes. In at least one embodiment, the tracking ID can be uniquely associated with a particular replication cycle of a particular source volume configured for near zero or low RPO replication. In this manner, querying the cache for tracked writes tagged with a particular tracking ID can denote the list of writes or data changes included in a particular corresponding replication cycle for a particular source volume. In at least one embodiment, low RPO replication can further include: retaining transient snapshots in the log; and retaining content to be replicated in the cache of the source system until such content has been replicated.

In at least one embodiment of low RPO replication, the following optimizations can be performed in connection with asynchronous replication for a configured stretched volume: write tracking can be performed where the list of changes or writes to be replicated for a particular snapshot can be stored in cache; transient snapshots can be held in the log without flushing until deleted; and content to be replicated can remain in the cache until replicated. Thus for the low RPO replication in at least one embodiment, all content or data to be replicated can be dirty and can remain in cache until replicated to the target system.

When a volume is demoted from the low RPO replication technique or mode in at least one embodiment, no optimizations of the low RPO replication technique are performed such that low RPO replication can be characterized as turned off and replaced with an alternative asynchronous replication technique. For a source volume in the off service level with respect to the low RPO replication mode in at least one embodiment, an alternative asynchronous replication technique can be performed rather than the low RPO replication technique. For example in at least one embodiment when in the off service level with respect to the low RPO technique, the alternative asynchronous replication technique performed can be the more time consuming legacy snapshot difference technique that includes flushing transient or replication related snapshots from the log, and then creating and/or updating corresponding metadata for the snapshots.

The foregoing and other aspects of the techniques of the present disclosure are described in more detail in the following paragraphs.

Referring to the FIG. 1, shown is an example of an embodiment of a system 10 that can be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 10.

Each of the host systems 14a-14n and the data storage system 12 included in the system 10 are connected to the communication medium 18 by any one of a variety of connections in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software that can be included in the data storage system 12 are described herein in more detail, and can vary with each particular embodiment. Each of the hosts 14a-14n and the data storage system 12 can all be located at the same physical site, or, alternatively, can also be located in different physical locations. The communication medium 18 used for communication between the host systems 14a-14n and the data storage system 12 of the system 10 can use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment can include data storage arrays or other components from one or more vendors. In subsequent examples illustrating the techniques herein, reference can be made to a single data storage array by a vendor. However, as will be appreciated by those skilled in the art, the techniques herein are applicable for use with other data storage arrays by other vendors and with other components than as described herein for purposes of example.

The data storage system 12 can be a data storage appliance or a data storage array including a plurality of data storage devices (PDs) 16a-16n. The data storage devices 16a-16n can include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contain no moving mechanical parts. The flash devices can be constructed using nonvolatile semiconductor NAND flash memory. The flash devices can include, for example, one or more SLC (single level cell) devices and/or MLC (multi level cell) devices.

The data storage array can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14a-n. The data storage array can include one or more RAs used, for example, to facilitate communications between data storage arrays. The data storage array can also include one or more device interfaces 23 for facilitating data transfers to/from the data storage devices 16a-16n. The data storage device interfaces 23 can include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25b can be used to facilitate data transfers and other communications between the device interfaces, the HAs and/or the RAs in a data storage array. In one embodiment, the device interfaces 23 can perform data operations using a system cache included in the global memory 25b, for example, when communicating with other device interfaces and other components of the data storage array. The other portion 25a is that portion of the memory that can be used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n through the channels. The host systems 14a-n do not address the drives or devices 16a-16n of the storage systems directly, but rather access to data can be provided to one or more host systems from what the host systems view as a plurality of logical devices, logical volumes (LVs) which are sometimes referred to herein as logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage which can be referenced by such logical unit numbers. In some embodiments, at least some of the LUNs do not correspond to the actual or physical disk drives or more generally physical storage devices. For example, one or more LUNs can reside on a single physical disk drive, data of a single LUN can reside on multiple different physical devices, and the like. Data in a single data storage system, such as a single data storage array, can be accessed by multiple hosts allowing the hosts to share the data residing therein. The HAs can be used in connection with communications between a data storage array and a host system. The RAs can be used in facilitating communications between two data storage arrays. The DAs can include one or more type of device interface used in connection with facilitating data transfers to/from the associated disk drive(s) and LUN(s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein can be made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that can be used to manage and monitor the data storage system 12. In one embodiment, the management system 22a can be a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration can be stored in any suitable data container, such as a database. The data storage system configuration information stored in the database can generally describe the various physical and logical entities in the current data storage system configuration. The data storage system configuration information can describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN can be accessed by the device interface following a data request in connection with I/O operations. For example, a host can issue an I/O operation which is received by the HA 21. The I/O operation can identify a target location from which data is read from, or written to, depending on whether the I/O operation is, respectively, a read or a write operation request. The target location of the received I/O operation can include a logical address expressed in terms of a LUN and logical offset or location (e.g., LBA or logical block address) on the LUN. Processing can be performed on the data storage system to further map the target location of the received I/O operation, expressed in terms of a LUN and logical offset or location on the LUN, to its corresponding physical storage device (PD) and address or location on the PD. The DA which services the particular PD can further perform processing to either read data from, or write data to, the corresponding physical device location for the I/O operation.

In at least one embodiment, a logical address LA1, such as expressed using a logical device or LUN and LBA, can be mapped on the data storage system to a physical address or location PA1, where the physical address or location PA1 contains the content or data stored at the corresponding logical address LA1. Generally, mapping information or a mapper layer can be used to map the logical address LA1 to its corresponding physical address or location PA1 containing the content stored at the logical address LA1. In some embodiments, the mapping information or mapper layer of the data storage system used to map logical addresses to physical addresses can be characterized as metadata managed by the data storage system. In at least one embodiment, the mapping information or mapper layer can be a hierarchical arrangement of multiple mapper layers. Mapping LA1 to PA1 using the mapper layer can include traversing a chain of metadata pages in different mapping layers of the hierarchy, where a page in the chain can reference a next page, if any, in the chain. In some embodiments, the hierarchy of mapping layers can form a tree-like structure with the chain of metadata pages denoting a path in the hierarchy from a root or top level page to a leaf or bottom level page.

In at least one embodiment, reading contents stored at a logical address LA1 such as to service a read I/O in response to a read cache miss can including traversing the mapping information of the chain of metadata pages mapping the logical address to a physical location or address of the content of LA1 as stored in BE non-volatile storage.

In at least one embodiment, a write I/O that writes content C1 to LA1 can be persistently recorded, such as in a log discussed elsewhere herein, and then an acknowledgement can be returned to the issuing client. Subsequently, the recorded write I/O can be flushed from the log. Flushing the recorded write I/O can include storing C1 at a physical location or address, and then creating and/or updating corresponding mapping information that maps LA1 the physical location of C1.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system, such as a data storage array, that includes multiple storage processors (SPs). Each of the SPs 27 can be a CPU including one or more "cores" or processors and each having their own memory used for communication between the different front end and back end components rather than utilize a global memory accessible to all storage processors. In such embodiments, the memory 26 can represent memory of each such storage processor.

Generally, the techniques herein can be used in connection with any suitable storage system, appliance, device, and the like, in which data is stored. For example, an embodiment can implement the techniques herein using a midrange data storage system as well as a high end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path can be the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22a to the data storage system 12. Such commands can be, for example, to establish or modify data services, provision storage, perform user account management, and the like.

The data path and control path define two sets of different logical flow paths. In at least some of the data storage system configurations, at least part of the hardware and network connections used for each of the data path and control path can differ. For example, although both control path and data path can generally use a network for communications, some of the hardware and software used can differ. For example, with reference to the FIG. 1, a data storage system can have a separate physical connection 29 from a management system 22a to the data storage system 12 being managed whereby control commands can be issued over such a physical connection 29. However in at least one embodiment, user I/O commands are never issued over such a physical connection 29 provided solely for purposes of connecting the management system to the data storage system. In any case, the data path and control path each define two separate logical flow paths.

With reference to the FIG. 2A, shown is an example 100 illustrating components that can be included in the data path in at least one existing data storage system in accordance with the techniques herein. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes directed to the LUNs 110a, 110b can be received for processing by either of the nodes 102a and 102b, the example 100 illustrates what is also referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2A is an internal network interconnect 120 between the nodes 102a, 102b. In at least one embodiment, the interconnect 120 can be used for internode communication between the nodes 102a, 102b.

In connection with at least one embodiment in accordance with the techniques herein, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be described and represented as the nodes 102a-b in the FIG. 2A. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2A, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

In at least one embodiment, a persisted log can be used for logging user or client operations, such as write I/Os. In at least one embodiment as discussed in more detail elsewhere where herein, the log can also be used to log or record other operations such as operations to create and delete snapshots of storage objects such as volumes or logical devices.

Consistent with other discussion herein, the log can be used to optimize write operation latency. Generally, the write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write or other operation in the log, the write or other operation is flushed or destaged from the log. In connection with flushing the recorded write operation from the log, the data written by the write operation is stored on non-volatile physical storage of a BE PD. The space of the log used to record the write operation that has been flushed can now be reclaimed for reuse. The write operation can be recorded in the log in any suitable manner and can include, for example, recording a target logical address to which the write operation is directed and recording the data written to the target logical address by the write operation. More generally, once an entry of recorded operation of the log is flushed from the log, the log space of the flushed entry can be reclaimed and reused.

In the log in at least one embodiment, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques of the present disclosure is provided below.

Figure 2B:
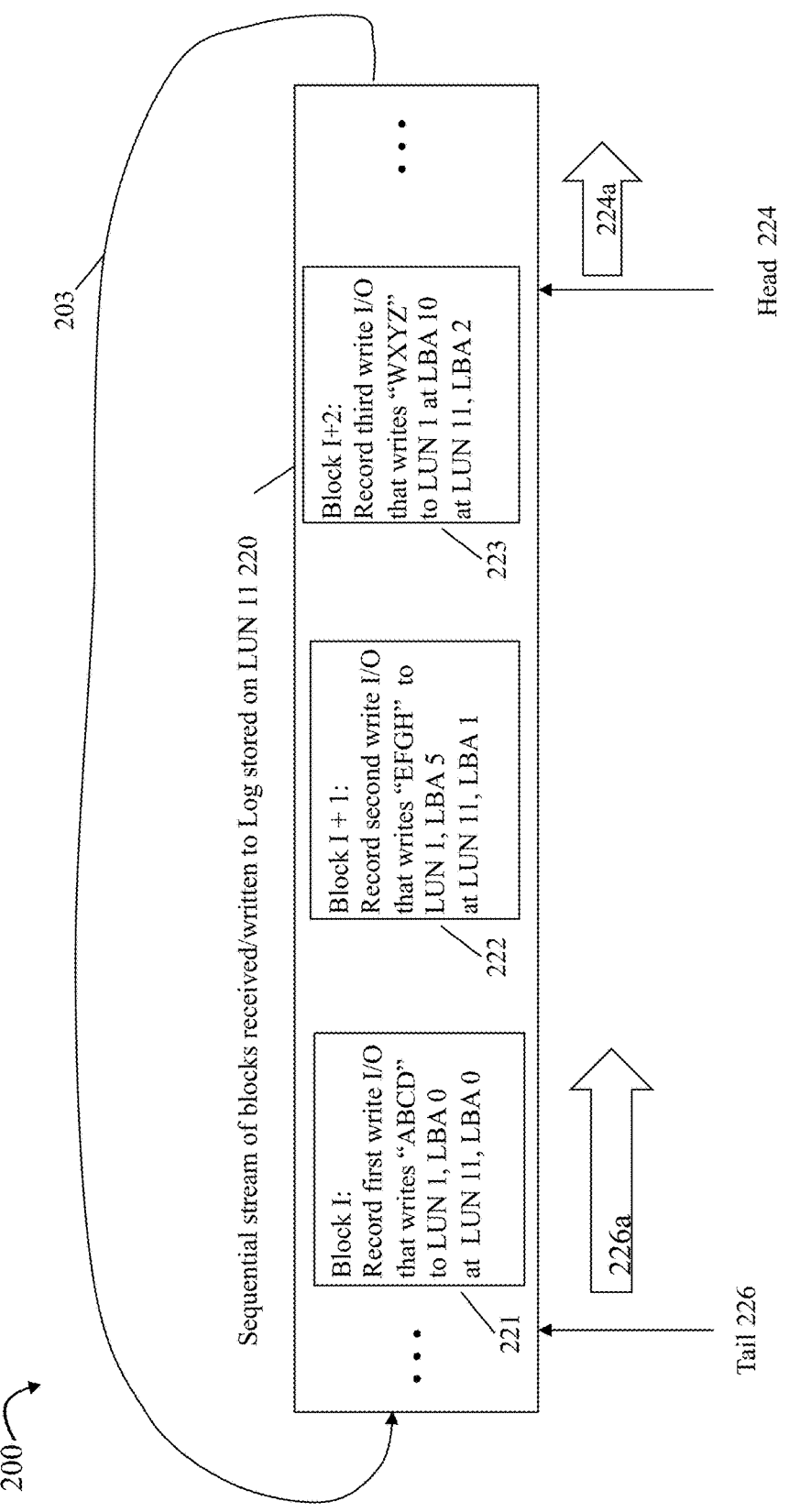
FIGS. 2B, 2C, 2D and 6 are examples illustrating use of a log in at least one embodiment in accordance with the techniques of the present disclosure.

Referring to FIG. 2B, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 2B, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224a to the next record in the log as each next write I/O operation is recorded. When the head pointer 224 reaches the end of the log by writing to the last sequential block or record of the log, the head pointer can advance 203 to the first sequential block or record of the log in a circular manner and continue processing. The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226a sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer advances 203 to the first sequential block or record of the log in a circular manner and continue processing. Thus, the circular logical manner in which the records or blocks of the log are processed form a ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described elsewhere herein. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 2C:
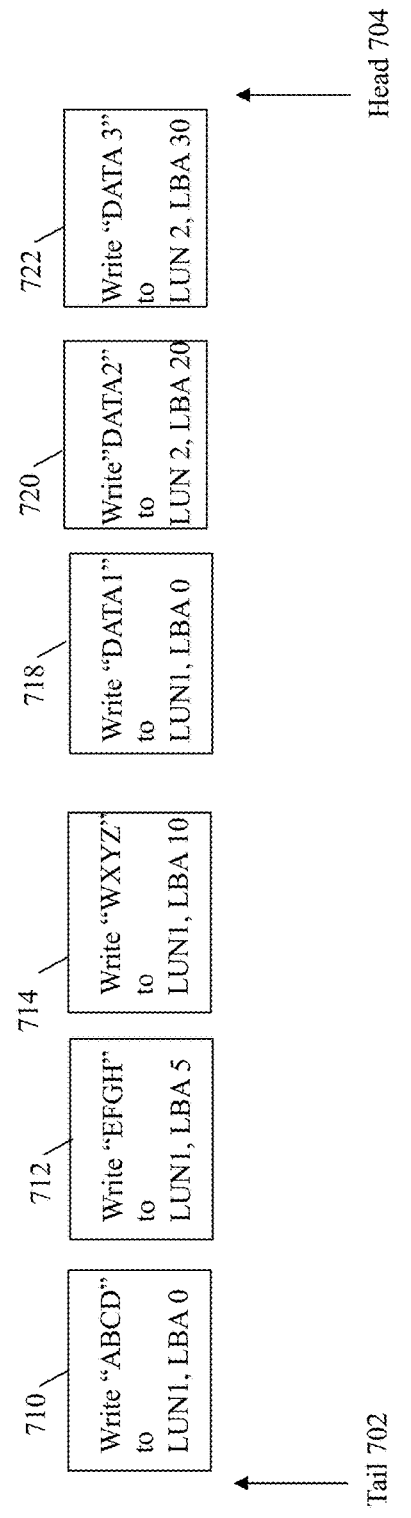

Referring to FIG. 2C, shown is an example of information that can be included in a log, such as a log of user or client write operations, in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 2C, the log records 710, 712, 714, 718, 720 and 722 can also record the write data (e.g., write I/O operation payload) written by the write operations. It should be noted that the log records 710, 712 and 714 of FIG. 2C correspond respectively to the log records 221, 222 and 223 of FIG. 2B.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. In some embodiments, portions of the log can be flushed in parallel in accordance with any necessary constraints needed in order to maintain data consistency. Such constraints can consider any possible data dependencies between logged writes (e.g., two logged writes that write to the same logical address) and other logged operations in order to ensure write order consistency.

Figure 2D:
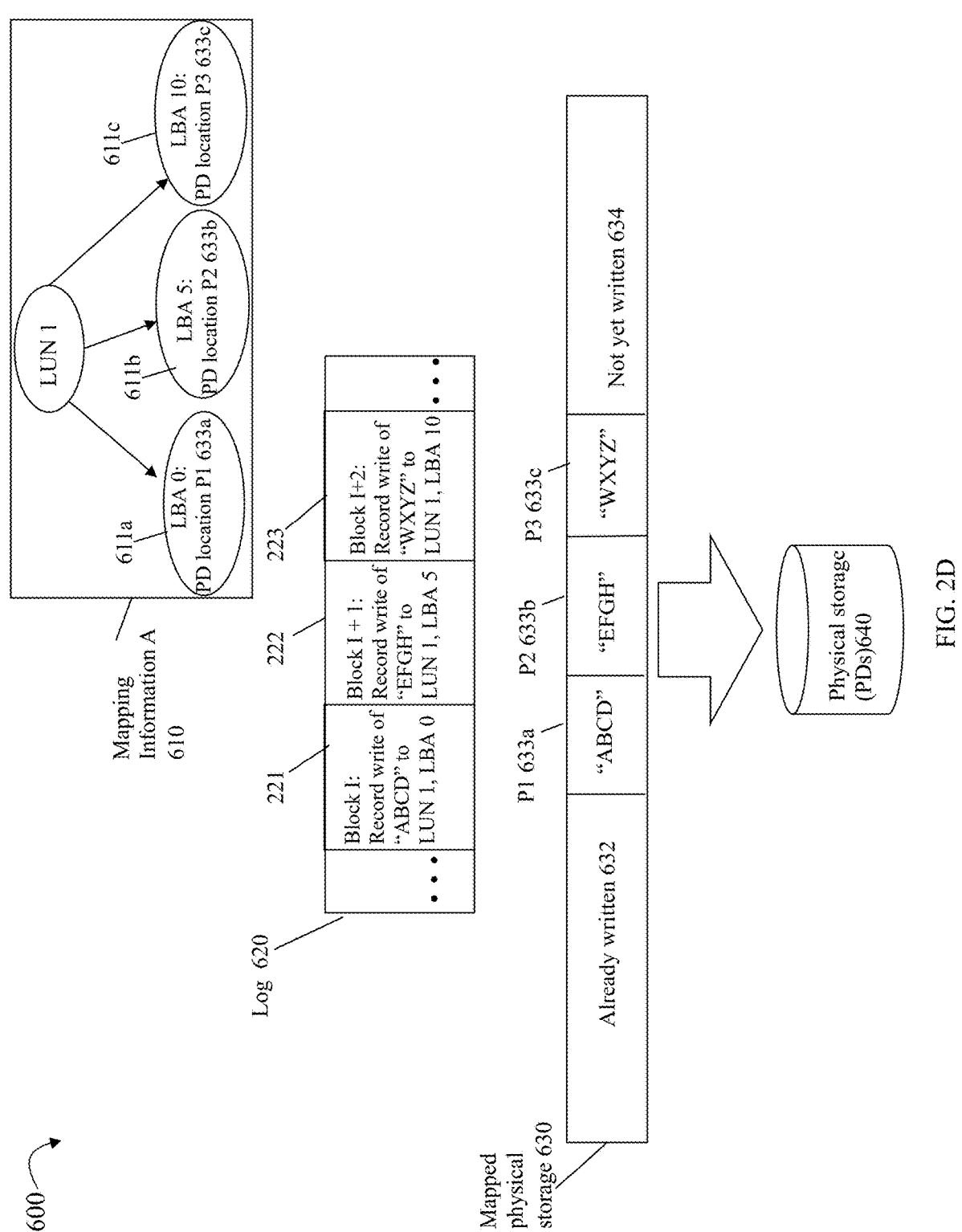

Referring to FIG. 2D, shown is an example 600 illustrating the flushing of logged writes and the physical data layout of user data on BE PDs in at least one embodiment in accordance with the techniques of the present disclosure. FIG. 2D includes the log 620, the mapping information A 610, and the physical storage (i.e., BE PDs) 640. The element 630 represents the physical layout of the user data as stored on the physical storage 640. The element 610 can represent the logical to physical storage mapping information A 610 created for 3 write I/O operations recorded in the log records or blocks 221, 222 and 223.

The mapping information A 610 includes the elements 611*a-c* denoting the mapping information, respectively, for the 3 target logical address of the 3 recorded write I/O operations in the log records 221, 222, and 223. The element 611*a* of the mapping information denotes the mapping information for the target logical address LUN1, LBA 0 of the block 221 of the log 620. In particular, the block 221 and mapping information 611*a* indicate that the user data "ABCD" written to LUN 1, LBA 0 is stored at the physical location (PD location) P1 633*a* on the physical storage 640. The element 611*b* of the mapping information denotes the mapping information for the target logical address LUN1, LBA 5 of the block 222 of the log 620. In particular, the block 222 and mapping information 611*b* indicate that the user data "EFGH" written to LUN 1, LBA 5 is stored at the physical location (PD location) P2 633*b* on the physical storage 640. The element 611*c* of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633*c* on the physical storage 640.

The mapped physical storage 630 illustrates the sequential contiguous manner in which user data can be stored and written to the physical storage 640 as the log records or blocks are flushed. In this example, the records of the log 620 can be flushed and processing sequentially (e.g., such as described in connection with FIG. 2B) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633*a*, 633*b*, 633*c* and 634. The element 632 denotes the physical locations of the user data written and stored on the BE PDs for the log records processed prior to the block or record 221. The element 633*a* denotes the PD location P1 of the user data "ABCD" stored at LUN 1, LBA 1. The element 633*b* denotes the PD location P2 of the user data "EFGH" stored at LUN 1, LBA 5. The element 633*c* denotes the PD location P3 of the user data "WXYZ" stored at LUN 1, LBA 10. The element 634 denotes the physical locations of the user data written and stored on the BE PDs for the log records processed after the block or record 223.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the user data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630.

Consistent with other discussion herein, the mapped physical storage 630 can correspond to the BE PDs providing BE non-volatile storage used for persistently storing user data as well as metadata, such as the mapping information.

Data replication is one of the data services that can be performed on a data storage system in an embodiment in accordance with the techniques herein. In at least one data storage system, remote replication is one technique that can be used in connection with providing for disaster recovery (DR) of an application's data set. The application, such as executing on a host, can write to a production or primary data set of one or more LUNs on a primary data storage system. Remote replication can be used to remotely replicate the primary data set of LUNs to a second remote data storage system. In the event that the primary data set on the primary data storage system is destroyed or more generally unavailable for use by the application, the replicated copy of the data set on the second remote data storage system can be utilized by the host. For example, the host can directly access the copy of the data set on the second remote system. As an alternative, the primary data set of the primary data storage system can be restored using the replicated copy of the data set, whereby the host can subsequently access the restored data set on the primary data storage system. A remote data replication service or facility can provide for automatically replicating data of the primary data set on a first data storage system to a second remote data storage system in an ongoing manner in accordance with a particular replication mode, such as an asynchronous mode described elsewhere herein.

Figure 3:
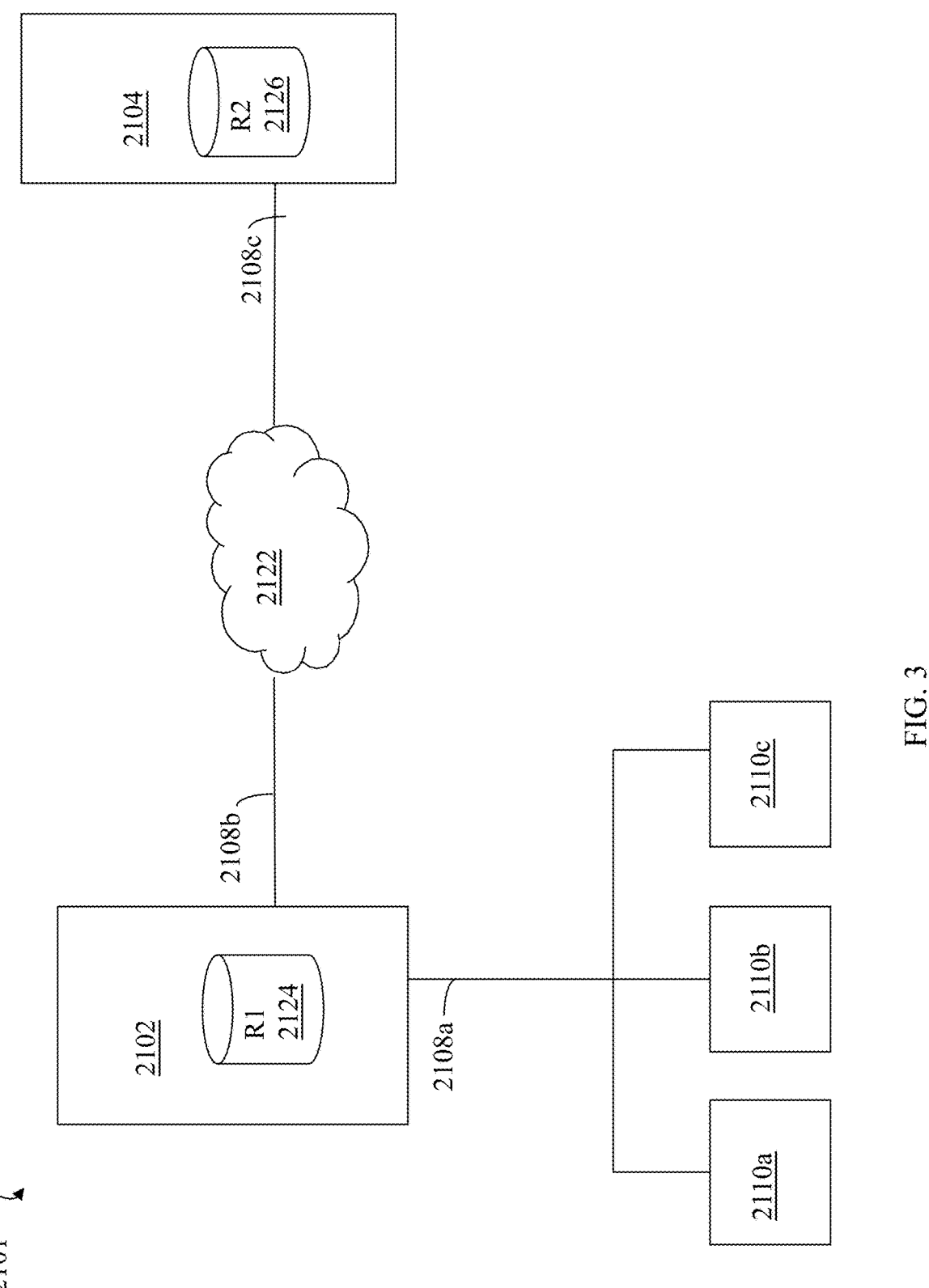
FIG. 3 is an example of an arrangement of systems that can be used in performing data replication.

Referring to FIG. 3, shown is an example 2101 illustrating remote data replication. It should be noted that the embodiment illustrated in FIG. 3 presents a simplified view of some of the components illustrated in FIGS. 1 and 2, for example, including only some detail of the data storage systems 12 for the sake of illustration.

Included in the example 2101 are the data storage systems 2102 and 2104 and the hosts 2110*a*, 2110*b* and 1210*c*. The data storage systems 2102, 2104 can be remotely connected and communicate over the network 2122, such as the Internet or other private network, and facilitate communications with the components connected thereto. The hosts 2110*a*, 2110*b* and 2110*c* can issue I/Os and other operations, commands, or requests to the data storage system 2102 over the connection 2108*a*. The hosts 2110*a*, 2110*b* and 2110*c* can be connected to the data storage system 2102 through the connection 2108*a* which can be, for example, a network or other type of communication connection.

The data storage systems 2102 and 2104 can include one or more devices. In this example, the data storage system 2102 includes the storage device R1 2124, and the data storage system 2104 includes the storage device R2 2126. Both of the data storage systems 2102, 2104 can include one or more other logical and/or physical devices. The data storage system 2102 can be characterized as local with respect to the hosts 2110*a*, 2110*b* and 2110*c*. The data storage system 2104 can be characterized as remote with respect to the hosts 2110*a*, 2110*b* and 2110*c*. The R1 and R2 devices can be configured as LUNs.

The host 2110*a* can issue a command, such as to write data to the device R1 of the data storage system 2102. In some instances, it can be desirable to copy data from the storage device R1 to another second storage device, such as R2, provided in a different location so that if a disaster occurs that renders R1 inoperable, the host (or another host)

can resume operation using the data of R2. With remote replication, a user can denote a first storage device, such as R1, as a primary or production storage device and a second storage device, such as R2, as a secondary storage device. In this example, the host 2110*a* interacts directly with the device R1 of the data storage system 2102, and any data changes made are automatically provided to the R2 device of the data storage system 2104 by a remote replication facility (RRF). In operation, the host 2110*a* can read and write data using the R1 volume in 2102, and the RRF can handle the automatic copying and updating of data from R1 to R2 in the data storage system 2104. Communications between the storage systems 2102 and 2104 can be made over connections 2108*b*, 2108*c* to the network 2122.

An RRF can be configured to operate in one or more different supported replication modes. For example, such modes can include synchronous mode and asynchronous mode, and possibly other supported modes. When operating in the synchronous mode, the host does not consider a write I/O operation to be complete until the write I/O has been completed or committed on both the first and second data storage systems. Thus, in the synchronous mode, the first or source storage system will not provide an indication to the host that the write operation is committed or complete until the first storage system receives an acknowledgement from the second data storage system regarding completion or commitment of the write by the second data storage system. In contrast, in connection with the asynchronous mode, the host receives an acknowledgement from the first data storage system as soon as the information is committed to the first data storage system without waiting for an acknowledgement from the second data storage system. It should be noted that completion or commitment of a write by a system can vary with embodiment. For example, in at least one embodiment, a write can be committed by a system once the write request (sometimes including the content or data written) has been recorded in a cache. In at least one embodiment, a write can be committed by a system once the write request (sometimes including the content or data written) has been recorded in a persistent transaction log.

With asynchronous mode remote data replication in at least one embodiment, a host 2110*a* can issue a write to the R1 device 2124. The primary or R1 data storage system 2102 can generally commit the write operation. The system 2102 can commit the write operation, for example, such as by storing the write data in its cache at a cache location and marking the cache location as including write pending (WP) data as mentioned elsewhere herein. As another example, the system 2102 can commit the write operation, for example, such as by recording the write operation in a persistent transaction log. At a later point in time, the write data is destaged, such as from the cache of the R1 system 2102 or the transaction log, to physical storage provisioned for the R1 device 2124 configured as the LUN A. Once the system 2102 has committed the write, the system 2102 can return an acknowledgement to the host 2110*a* regarding completion of the write. Thus, the acknowledgement sent from the system 2102 to the host 2110*a* regarding completion of the write is sent independent of any replication or communication of the write to the remote R2 system 2104. Additionally, the RRF operating in the asynchronous mode can replicate or propagate the write across an established connection or link (more generally referred to as a the remote replication link or link) such as over 2108*b*, 2122, and 2108*c*, to the secondary or R2 data storage system 2104 where the write can be committed on the system 2104. The system 2104 can generally commit the write in any suitable manner such as similar to described above in connection with the R1 system 2102. Subsequently, the write can be destaged, for example, from the cache of the R2 system 2104 or the transaction log of the R2 system 2104, to physical storage provisioned for the R2 device 2126 configured as the LUN A. Once the R2 system 2104 has committed the write, the R2 system 2104 can return an acknowledgement to the R1 system 2102 that it has received the replicated write. Thus, generally, R1 device 2124 and R2 device 2126 can be logical devices, such as LUNs, configured as asynchronous copies of one another, where there is some acceptable level of data difference between the R1 and R2 devices and where R1 represents the most recent or up to date version. R1 and R2 devices can be, for example, fully provisioned LUNs, such as thick LUNs, or can be LUNs that are thin or virtually provisioned logical devices.

Figure 4:
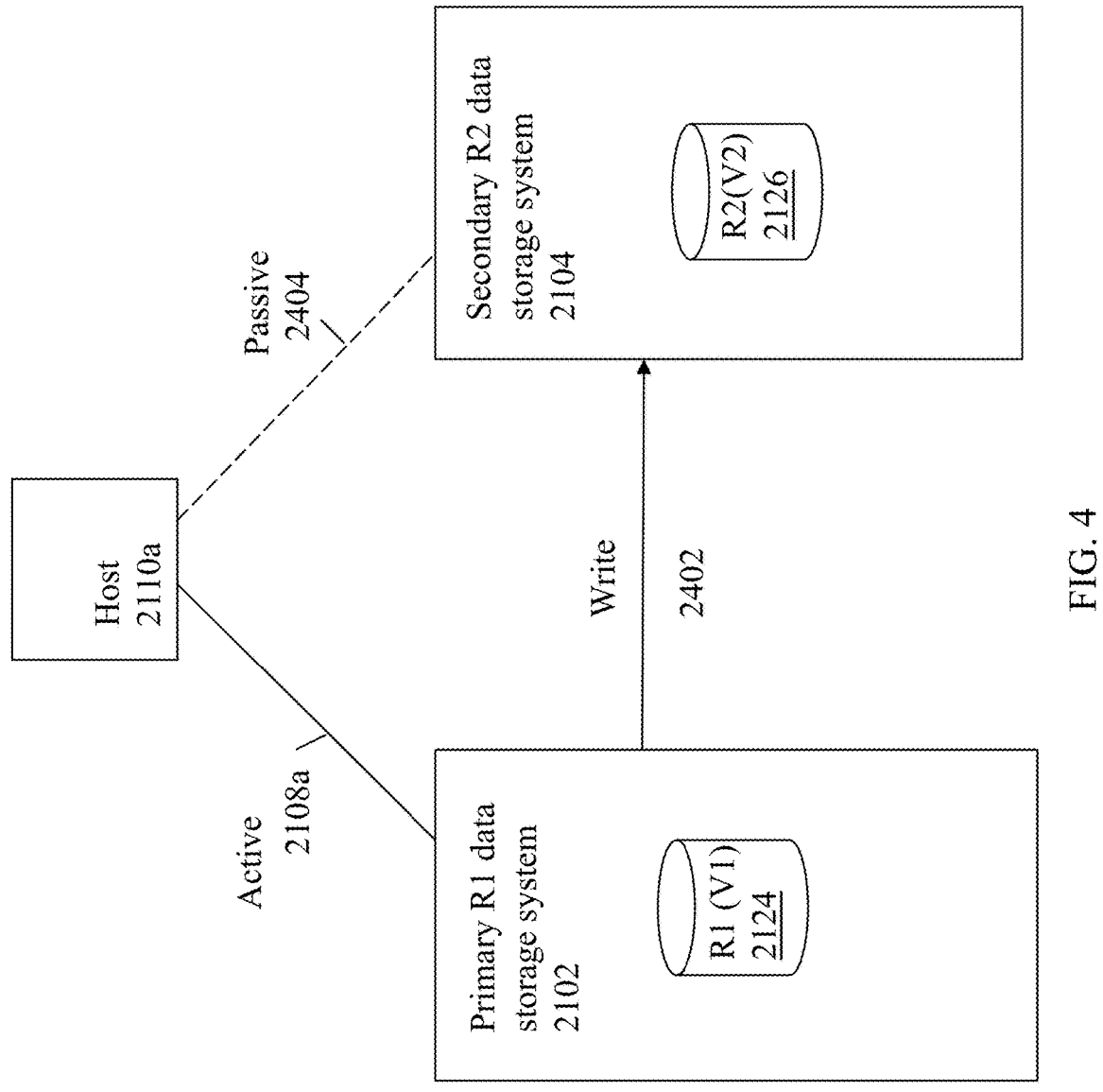
FIG. 4 is an example illustrating a replication configuration in at least one embodiment in accordance with the techniques of the present disclosure.

With reference to FIG. 4, shown is a further simplified illustration of components that can be used in in connection with remote replication. The example 2400 is simplified illustration of components as described in connection with FIG. 2A. The element 2402 generally represents the replication link used in connection with sending write data from the primary R1 data storage system 2102 to the secondary R2 data storage system 2104. The link 2402, more generally, can also be used in connection with other information and communications exchanged between the systems 2102 and 2104 for replication. As mentioned above, when operating in asynchronous replication mode in the embodiment of FIG. 4, the host 2110*a* issues a write, or more generally, all I/Os including reads and writes, over a path to only the primary R1 data storage system 2102. The host 2110*a* does not issue I/Os directly to the R2 data storage system 2104. The configuration of FIG. 4 can also be referred to herein as an active-passive configuration with asynchronous replication performed from the R1 data storage system 2102 to the secondary R2 system 2104. With the active-passive configuration of FIG. 4, the host 2110*a* has an active connection or path 2108*a* over which all I/Os are issued to only the R1 data storage system. The host 2110*a* can have a passive connection or path 2404 to the R2 data storage system 2104. Writes issued over path 2108*a* to the R1 system 2102 can be asynchronously replicated to the R2 system 2104.

In at least one embodiment of the configuration of 2400, the R1 device 2124 (e.g., volume V1) and the R2 device 2126 (e.g., the volume V2) can be configured and identified as the same volume or LUN, such as LUN A, to the host 2110*a*. Thus, the host 2110*a* can view 2108*a* and 2404 as two paths to the same LUN A, where path 2108*a* is active (over which I/Os can be issued to LUN A) and where path 2404 is passive (over which no I/Os to the LUN A can be issued whereby the host is not permitted to access the LUN A for I/Os over path 2404). For example, in a SCSI-based environment, the devices V1 2124 and V2 2126 can be configured to have the same logical device identifier such as the same world-wide name (WWN) or other identifier as well as having other attributes or properties that are the same. Should the connection 2108*a* and/or the R1 data storage system 2102 experience a failure or disaster whereby access to V1 2124 configured as LUN A is unavailable, processing can be performed on the host 2110*a* to modify the state of path 2404 to active and commence issuing I/Os to the V2 device configured as LUN A. In this manner, the V2 device 2126 configured as LUN A can be used as a backup accessible to the host 2110*a* for servicing I/Os upon failure of the V1 device 2124 configured as LUN A. Alternatively, recovery processing can include copying content from V2 device 2126 of the R2 system 2104 to the V1 device 2124 of the R1 system 2102 to thereby restore V1 2124. Subsequent to restoring V1 2124, the host 2110a can resume issuing I/Os to V1 2124 over path 2108a where any write I/Os directed to V1 2124 can be replicated and applied in an asynchronous manner to V2 2126 on the storage system 2104.

In at least one embodiment, the pair of devices or volumes including the V1 or R1 device 2124 and the V2 or R2 device 2126 can be configured as the same single volume or LUN, such as LUN A, to expose the two different devices or volumes (e.g., V1 or R1 2124; V2 or R2 2326), on two different data storage systems 2102, 2104 to the host 2110a as the same single volume or LUN. Thus, from the view of the host 2110a, the same LUN A is exposed and thus discoverable over the two paths 2108a and 2404, where R1/V1 and R2/V2 are both configured as the same logical volume or LUN A and where R1/V1 and R2/V2 both have the same identity as presented, viewed or exposed to an external host. However in at least one embodiment, host I/Os directed to LUN A sent over active path 2108a can be serviced, and where host I/Os directed to LUN A may not be sent over passive path 2404 and may not be serviced.

It should be noted although only a single replication link 2402 is illustrated, more generally any number of replication links can be used in connection with replicating data from systems 2102 to system 2104.

Although examples in the following paragraphs refer to a volume or LUN, more generally, the techniques of the present disclosure can be generalized for use with a storage object or resource which can be a volume or LUN, one or more file systems, a virtual volume or vvol used in connection with virtual machines, one or more files, one or more directories of files or other object, and any other suitable storage resource or object.

Generally, the primary or R1 storage system 2102 can also be referred to as a source system or site; the secondary or R2 storage system 2104 can also be referred to as a destination, target or disaster recovery (DR) system or site; the R1/V1 device 2124 can also be referred to as a production or source volume or LUN having a corresponding R2/V2 device 2126 which can also be referred to as a target, destination or replica volume or LUN.

Consistent with discussion above, the RRF or remote replication facility can perform asynchronous replication of a stretched volume, resource or object in at least one embodiment. The asynchronous replication configuration can be generally as discussed herein such as the asynchronous remote replication configuration as in FIG. 4. In at least one embodiment, the asynchronous replication configuration can be a near zero or low RPO replication configuration of a stretched volume, where the RRF performs processing of the low RPO replication technique.

Consistent with discussion above, the asynchronous replication of the stretched volume can be performed using the low RPO techniques discussed herein. The low RPO replication techniques in at least one embodiment can perform several optimizations that provide for the very low or near zero RPO achieved for a stretched volume or storage object. A stretched volume can be configured for asynchronous replication, in particular for low RPO replication, from a volume pair (V1, V2), where V1 denotes the source volume on the source system, and where V2 denotes the target volume on the target system.

Below is an initial discussion of further details regarding the various optimizations that can be performed by the low RPO replication technique in at least one embodiment in accordance with the present disclosure. Subsequently, there is a discussion regarding embodiments of the techniques of the present disclosure that further provide for selecting one or more candidate volumes, operating using the low RPO replication for asynchronous replication, for demotion to an alternative asynchronous replication mode in efforts to manage system resources.

In at least one embodiment, performing asynchronous replication using the low RPO replication mode or technique can have a lower adverse impact on the storage system than other asynchronous replication techniques such as the legacy snapshot difference technique. In at least one embodiment, the foregoing can be based, at least in part, on i) the list of differences between successive replication related or transient snapshots being maintained in the cache or memory and/or ii) the ability to retain such replication related or transient snapshots in the log. By retaining the transient snapshots in the log until related content has been replicated, the transient snapshots can be deleted or removed efficiently without incurring more expensive processing when such snapshots are flushed with corresponding metadata created, and then when such snapshots are subsequently deleted.

In at least one embodiment, the low RPO replication mode for asynchronous replication relies on limited cache or volatile memory resources and log space. In at least one embodiment, a specified amount of memory, sometimes referred to as write tracking memory or cache, can be allocated and used for write tracking across all volumes configured for asynchronous replication using the low RPO replication mode or technique. As the I/O load on the volumes and/or the number of volumes operating using the low RPO replication mode for asynchronous replication increases, the resources, such as the write tracking memory or cache consumed in connection with such replication also increases. As a result, the amount of write tracking cache available can run low and can be insufficient to sustain performing low RPO replication for at least some of the volumes thereby causing at least these particular volumes to go out of RPO compliance such that low RPO replication is not performed for the particular volumes. In at least one embodiment, when asynchronous replication using the low RPO replication technique cannot be performed such as due to insufficient write tracking memory or cache, asynchronous replication for such volumes can be performed using an alternative technique, such as the legacy snapshot difference technique. In at least one embodiment the alternative technique such as the legacy snapshot difference technique may not perform the asynchronous replication optimizations of the low RPO replication. Thus, the alternative technique may not use the write tracking memory or cache resource that is otherwise used and consumed by the low RPO replication technique. In at least one embodiment, the alternative technique can be used rather than the low RPO replication technique until corresponding resource pressure or consumption, such as of the write tracking memory or cache, has abetted such that the amount of available or free write tracking memory increases to a sufficient level.

In at least one embodiment, rather than wait until one or more volumes fall out of compliance such that an alternative asynchronous replication technique is performed rather than the low RPO replication technique as a result of depletion of the write tracking memory or insufficient available write tracking memory, the techniques of the present disclosure can be performed to further pre-emptively and proactively demote selected one or more candidate volumes from the low RPO replication technique or mode to the alternative asynchronous replication technique or mode. The foregoing can be performed in efforts to relieve the resource pressure and consumption demand, such as with respect to the write tracking memory. By acting pre-emptively or proactively in at least one embodiment, the techniques of the present disclosure can be used to purposefully and proactively select one or more particular volumes for demotion rather than have other volumes fall out of RPO compliance (e.g., no low RPO replication technique performed) and use the alternative asynchronous replication mode or technique. In at least one embodiment, when the system load reduces and the available resource, such as write tracking cache, used in connection with low RPO replication mode, increases to a sufficient level, processing can be performed by the storage system to promote or restore the demoted volumes back to the low RPO replication mode and take advantage of the optimizations of the low RPO replication mode.

In at least one embodiment, the techniques of the present disclosure can be used to select one or more particular volumes to demote based, at least in part, on several different factors or criteria described herein to ensure minimal adverse system impact while maintaining compliance with low RPO replication on as many volumes as possible.

In at least one embodiment in accordance with the techniques of the present disclosure, processing can be performed to monitor resource consumption and determine free or available amounts of the resources. In at least one embodiment, one of the resources monitored in connection with low RPO replication can include the write tracking memory or cache.

In at least one embodiment in response to free or an available amount of the write tracking memory or cache falling below a corresponding threshold, processing can be performed to select one or more volumes for demotion from the low RPO replication mode to an alternative asynchronous replication technique. In at least one embodiment in response to free or an available amount of the write tracking memory or cache rising above a corresponding threshold, processing can be performed to restore low RPO replication for one or more previously demoted volumes.

In at least one embodiment in accordance with the techniques of the present disclosure, processing can be performed to monitor resource consumption and determine a total amount of resource consumption consumed in connection with all volumes operating in accordance with the low RPO technique for asynchronous replication. In at least one embodiment, one of the resources monitored in connection with low RPO replication can include the write tracking memory or cache.

In at least one embodiment in response to a total consumed amount of the write tracking memory or cache being above a corresponding threshold, processing can be performed to select one or more volumes for demotion from the low RPO replication mode to an alternative asynchronous replication technique. In at least one embodiment in response to the total consumed amount of the write tracking memory or cache rising above the corresponding threshold, processing can be performed to restore low RPO replication for one or more previously demoted volumes.

In the following paragraphs, examples can be provided in embodiments where the stretched storage object is a stretched volume or logical device. More generally, the techniques of the present disclosure can be used with other types of storage objects.

The foregoing and other aspects of the techniques of the present disclosure are described in more detail in the following paragraphs.

Figure 5A:
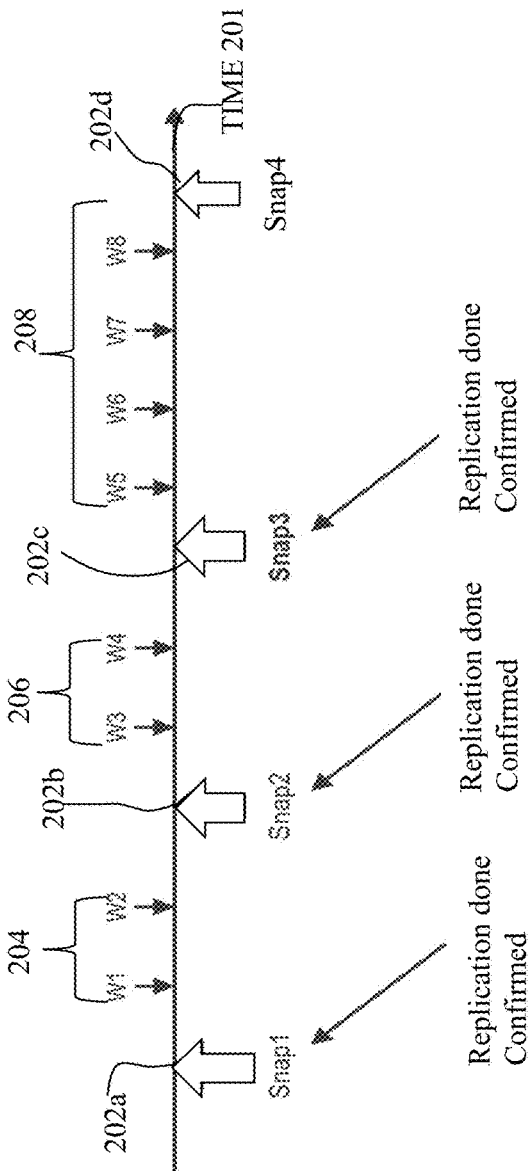
FIG. 5A is an example illustrating determining data differences for a replication configuration in at least one embodiment in accordance with the techniques of the present disclosure.

Referring to FIG. 5A, shown is an example 200 illustrating general use of replication related or transient snapshots in connection with asynchronous replication, such as a low RPO replication for a stretched volume as well as the snapshot difference technique, in at least one embodiment in accordance with the techniques of the present disclosure.

The example 200 illustrates replication related snapshots 202a-d of a storage object such as a source volume of a source storage system taken at various points in time along a timeline 201. The snapshot snap1 202a is taken at a first point in time P1 and can be marked as a replication related snapshot. The snapshot snap2 202b is taken at a second point in time P2 (subsequent to taking snap1 202a at P1) and can be a marked as a replication related snapshot. The snapshot snap3 202c is taken at a third point in time P3 (subsequent to taking snap2 202b at P2) and can be marked as a replication related snapshot. The snapshot snap4 202d is taken at a fourth point in time P4 (subsequent to taking snap3 202c at P3).

In at least one embodiment, each of the replication related snapshots 202a-d can also be marked or flagged as a transient snapshot.

The writes W1 and W2 of 204 denote the writes occurring between taking snapshots 202a and 202b, whereby writes of 204 denote data changes between snapshots 202a-b. The writes W3 and W4 of 206 denote the writes occurring between taking snapshots 202b and 202c, whereby the writes of 206 denote data changes between snapshots 202b-c. The writes W5-W8 of 208 denote the writes occurring between taking snapshots 202c and 202d whereby the writes of 208 denote data changes between the snapshots 202c-d.

The writes 204 can denote the replicated writes of a single asynchronous replication cycle between snapshots 202a-b; the writes 206 can denote the replicated writes of a single asynchronous replication cycle between snapshots 202b-c; and the writes 208 can denote the replicated writes of a single asynchronous replication cycle between the snapshots 202c-d.

Consistent with discussion elsewhere in at least one embodiment in accordance with the techniques of the present disclosure with the low RPO replication technique or mode, write tracking can be performed by a caching layer or cache to determine the replicated writes of each replication cycle corresponding to a particular tracking ID that uniquely identifies a particular replication cycle of the particular source volume. Processing can be performed to extract data changes of a replication cycle based on the tracked writes with the particular tracking ID as identified by the cache or caching layer.

Consistent with other discussion herein in connection with at least one embodiment of the low RPO replication, records of the writes 204 can remain in the cache until the writes 204 have been replicated from the source system to the target system whereby the replication of such subsequent writes 204 following the snap 202a are confirmed as committed on the target system. Records of the writes 206 can remain in the cache until the writes 206 have been replicated from the source system to the target system whereby the replication of such subsequent writes 206 following the snap 202b are confirmed as committed on the target system. Records of the writes 208 can remain in the cache until the writes 208 have been replicated from the source system to the target system whereby the replication of such subsequent writes 208 following the snap 202c are confirmed as committed on the target system.

In at least one embodiment, the replication snapshot operation N and all subsequent writes prior to the next successive replication snapshot N+1 taken for replication can be held or retained in the cache until all such subsequent writes have been replicated to the target system where the target system has confirmed or acknowledged the replication of such writes.

In at least one embodiment, records of the transient snapshots as recorded in the log can remain in the log and not flushed until deleted, such as by a remote replication facility or RRF performing asynchronous replication using the low RPO replication techniques described herein.

In at least one embodiment of the low RPO replication techniques, processing can be performed such as by a cache or caching layer to generally track changed data locations of the source volume or storage object on the source system, where the contents of the changed locations is what need to be replicated to the target volume or storage object of the target system. In at least one embodiment, such data changes can be read by the source system, replicated to the target system, and written to the target volume of the target system on each replication cycle. With the low RPO technique, optimizations can be enabled and applied that provide for tracking the changed locations of volumes that have been written to between successive replication related snapshots where such changed locations can be stored in the cache in the write tracking memory or cache. Additionally, the low RPO technique can provide for retaining data to be replicated in the cache and thus read from cache (as opposed to reading from BE non-volatile storage) by asynchronous replication processing.

In at least one embodiment, processing of the low RPO replication technique can include continually taking replication related snapshots or snaps of a source volume V1; tracking, in the write tracking memory or cache, writes of each replication cycle between two successive replication related snapshots using a unique tracking ID; using metadata or information recorded in the write tracking memory for the tracked writes to determine a set or list of corresponding locations of V1 denoting locations of V1 that have been modified or written in a particular replication cycle; extracting data changes of the corresponding locations for the corresponding replication cycle; and replicating the data changes of the replication cycle from the source system to the target system. Additionally, as the data or writes between successive snapshots N−1 and N are replicated from the source system to the target system, the low RPO replication technique can further include deleting the replication related snapshot N−1; and also deleting or otherwise reusing the cache storage consumed for the list of tracked writes. If the replication related snapshot is in the log and thus deleted from the log, the writes subsequent to the deleted snapshot can now be flushed from the log. If the replication related or transient snapshot has been flushed from the log and is deleted after the log entry to create the snapshot has been flushed, deleting the replication related snapshot can include deleting any associated metadata of the deleted snapshot. If the replication related snapshot has been flushed from the log, records of subsequent writes may have also been flushed from the log but retained in cache until replicated. If the replication related snapshot has not been flushed from the log, records of the subsequent writes are also not flushed, where the write data of such subsequent writes is dirty and can remain in the cache until replicated and flushed.

In at least one embodiment, the data differences or changed content can be determined, replicated or written to the target system, and then applied to the corresponding target volume. In at least one embodiment, the list of locations having content to be replicated can be obtained from the list maintained in the cache by write tracking. The content or data replicated can be read from cache since in at least one embodiment of the low RPO replication technique, the content or data to be replicated for a particular replication cycle can remain in cache until replicated.

Figure 5B:
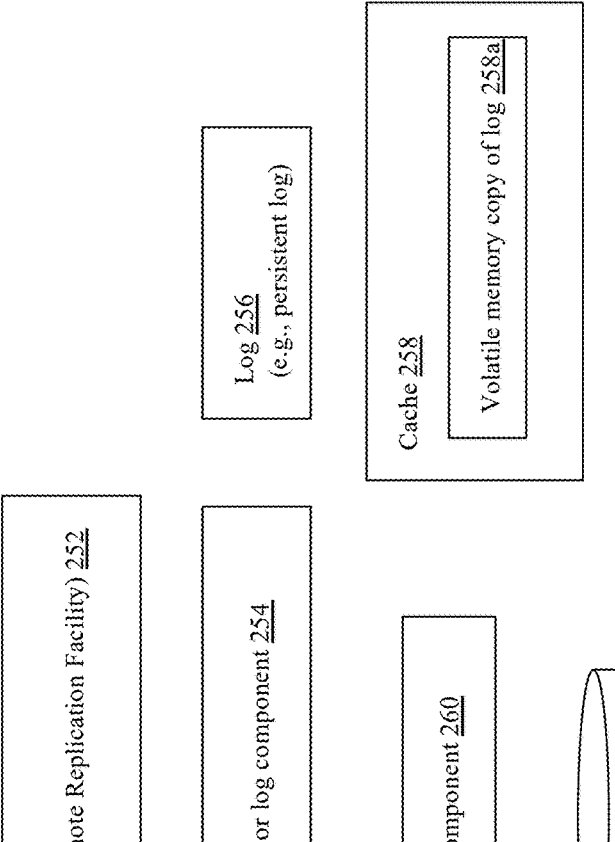
FIG. 5B is an example of components that can be included in a system in at least one embodiment of the techniques of the present disclosure.

Referring to FIG. 5B, shown is an example 250 of components on a storage system that can be used in an embodiment in accordance with the techniques of the present disclosure.

In at least one embodiment the components of 250 can be included in the source storage system configured to perform asynchronous replication using the low RPO techniques in accordance with the present disclosure.

The components 250 can include a remote replication facility or RRF 252, a logger or log component 254, a mapper component 260, a log 256 denoting a persistently stored log of recorded operations, a cache 258, and BE non-volatile storage 262. The cache 258 can generally be a volatile memory cache and can include a volatile memory copy 258a of the log 256. Put another way, in at least one embodiment, element 258a can denote an in-memory copy of the log 256, where the in-memory or volatile memory copy 258a can include the same information as the persistent log 256. In at least one embodiment, the copy 258a of the log can be accessed and used to perform processing described herein rather than the persistent copy 256 of the log. In at least one embodiment, the copy 258a of the log can have a corresponding layout and organization of content that can be different from the persisted log 256, where the organization of 258a can be designed for quicker retrieval, updating and/or management than that of the persisted log 256. In at least one embodiment, the persisted log 256 can be used in the event of system failure or reboot to repopulate the volatile memory copy 258a of the log. In at least one embodiment, committing a record or transaction to the log, such as part of ingest processing of a command or operation, can include storing corresponding records in both the persisted log 256 and the volatile memory copy 258a of the log. In at least one embodiment with a dual node system, committing a record or transaction to the log can also include communicating the committed or recorded operations between the peer nodes to ensure that both nodes have synchronized volatile memory copies of the log.

In at least one embodiment of a dual node system, each node can include node-local instances of 252, 254, 258, and 260. In at least one embodiment of a dual node system, there can be a single persistent log 256 accessed and used by both nodes. Additionally, the storage 262 can denote BE non-volatile storage accessed and used by both nodes.

The RRF 252 can be configured to perform asynchronous replication using the low RPO techniques of the present disclosure.

The mapper component 260, sometimes referred to as the mapper, can maintain mapping information of metadata pages used to map logical addresses, such as of user data or content, to corresponding physical addresses or locations of content stored at the logical addresses. The physical addresses or locations can correspond to storage locations in the BE non-volatile storage 262. Consistent with other discussion herein in at least one embodiment, the metadata pages can be organized in a hierarchal tree structure of multiple layers of metadata pages. In at least one embodiment, the hierarchical structure of multiple layers of metadata (MD) pages can include a layer of top MD pages, a layer of mid MD pages, a layer of leaf MD pages, where each top page can include pointers to multiple mid pages, each mid page can include multiple pointers to multiple leaf pages. Each leaf page can include multiple entries each associated with a logical address, where the leaf page entry for a logical address can include a reference, pointer, or address used to access a physical storage location of 262 containing content of the logical address. In at least one embodiment, the reference of the leaf page entry for a logical address can be an indirect pointer to the physical storage location of content stored at the logical address. In at least one embodiment, the mapping information mapping a logical address LA1 to a corresponding physical location PA1 of content stored at LA1 can include a chain of the metadata pages including top, mid and leaf MD (metadata) pages, where the top page points to a mid page, and where the mid page points to a leaf page, and where an entry of the leaf page includes the indirect pointer to PA1. In at least one embodiment, flushing a recorded write I/O of the log where the write I/O writes content C1 to LA1 can include: storing C1 at PA1; and creating and/or updating the mapping information of the chain of metadata pages used to map LA1 to PA1.

In at least one embodiment, flushing a recorded command or operation to take a snapshot can also include allocating and/or updating metadata pages for the new snapshot. In at least one embodiment, write I/Os to a source volume can result in write splits with respect to metadata pages shared with a snapshot of the source volume, where a write split can resulting in allocating one or more new metadata pages to accommodate the snapshot and writes to the source volume. As a result, deleting the snapshot once it has been flushed from the log can include the expensive process of deleting and/or updating metadata pages corresponding to the snapshot and its writes. Thus in at least one embodiment using the low RPO replication technique, retaining a transient snapshot in the log until deleted can use additional cache and log resources for an extended period of time while also avoiding or omitting performing the expensive processing associated with deleting a snapshot after it has been actually created as a result of flushing the log entry of the create snapshot command from the log.

The log component 254 can be configured to: record operations, commands or requests in the log 256, 258*a*; enforce constraints and dependencies between various operations that can be recorded in the log; and control flushing of the log 256, 258*a* to the mapper component 260. In accordance with the techniques of the present disclosure with the low RPO technique, the log component 254 can be configured to delay flushing recorded commands or operations, such as a command or operation to take or create transient snapshots, based on an indicator, such as a transient flag (TF) setting of the command to take a transient snapshot of a source volume.

In at least one embodiment, ingest processing of a write I/O and a snapshot related command (e.g., to create a snapshot of a volume or storage object and/or delete an existing snapshot of a volume or storage object) can include recording (e.g., committing) the command or operation in the log. Once the foregoing is recorded in the log, an acknowledgement can be returned to the client or originator of the command or operation just recorded in the log.

In at least one embodiment, the RRF 252 can be the client originating i) the command to create a transient or replication related snapshot and ii) the command to delete an existing transient or replication related snapshot. In at least one embodiment, write I/Os directed to a source volume configured for asynchronous replication using the low RPO techniques can be received at the storage system from a host or other external storage client. Subsequently, recorded operations or commands of the log can be flushed such as by the logger or log component 254. In at least one embodiment, flushing a recorded write I/O that writes content C1 to a first logical address LA1 can include: persistently storing C1 at a physical address or location PA1 on BE non-volatile storage 262; and creating and/or updating corresponding mapping information mapping LA1 to PA1.

Figure 6:
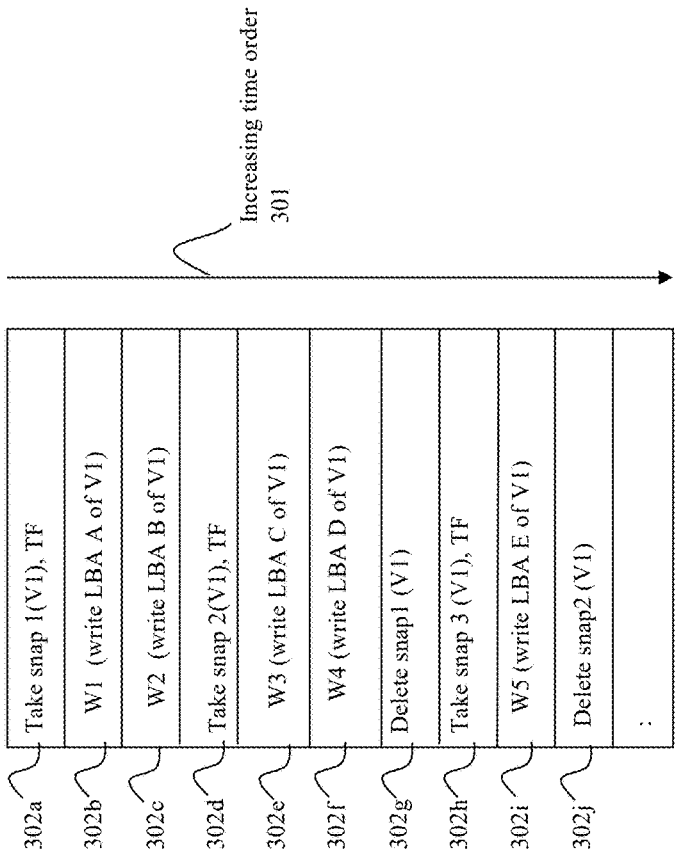

Referring to FIG. 6, shown is an example 300 illustrating use of the log in connection with recording transient or replication related snapshot operations and writes in at least one embodiment in accordance with the techniques of the present disclosure.

In the example 300, operations can be recorded as entries in the log in increasing time order as indicated by the arrow 301. Thus the records 302*a-j* denote operations, requests or commands recorded and committed to the log at various points in time in increasing time order.

Initially, a request or command to take or create a first transient or replication related snapshot, snap1, of the source volume V1, can be made by the RRF performing the low RPO replication techniques. The request to take snap1 of V1 is recorded in the log as record 302*a*, the transient flag (TF) is set for snap1 to signal to delay flushing the record 302*a*. In at least one embodiment, a log entry creating a snapshot can be viewed as a barrier record such that writes subsequent to the log entry for the create snapshot command are not flushed until the log entry for the create snapshot command is first flushed. Thus based on normal ordering of records of the log in at least one embodiment, the logger prevents write records, that occur in the log after a second record taking a snapshot, from being flushed prior to flushing the second record taking/creating the snapshot.

After recording 302*a* in the log, the storage system can receive writes W1 and W2 that are respectively recorded as entries 302*b-c* in the log. W1 and W2 can be writes directed respectively to LBAs A and B of V1 In at least one embodiment, the write records 302*b-c* would normally induce write splits in the mapper 260 if the record 302*a* taking snap1 were allowed to be flushed before the records W1 and W2. In at least one embodiment in accordance with the low RPO replication technique, this can be avoided by delaying flushing of record 302*a* based on the transient flag TF.

Subsequent to recording the entries 302*b-c* in the log, RRF can issue a command or request to take a second transient or replication related snapshot, snap2, of the source volume V1. The request to take snap2 of V1 is recorded in the log as record 302*d*, where snap2 can have the transient flag (TF) set to signal to delay flushing the record 302*d*.

After recording 302*d* in the log, the storage system can receive writes W3 and W4 that are respectively recorded as entries 302*e-f* in the log. W3 and W4 can be writes directed respectively to LBAs C and D of V1 In at least one embodiment, the write records 302*e-f* would normally induce write splits in the mapper 260 if the record 302*d* taking snap2 were allowed to be flushed before the records W3 and W4. In at least one embodiment, this can be avoided by delaying flushing of record 302*d* based on the transient flag TF.

After recording entries 302*e-f* in the log, the RRF can issue a command or request to delete the transient or replication related snapshot, snap1 of V1. Snap1 of V1 is the snapshot instance taken by the recorded command of the record 302*a*. The command to delete snap1 of V1 can be recorded in entry 302*g* of the log. At some later point in time, the logger can associate delete snap1 record 302*g* with the create snap1 record 302*a*, and invalidate the create snap1 record 302*a*. As such in at least one embodiment using the low RPO replication technique, the logger can be viewed as cancelling the creation or taking of snap1 of V1 such that mapper does not perform any processing related to creating or deleting the snap1 of V1. The result of such invalidation by logger is to allow the write records W1 302*b* and W2 302*c* without inducing write splits in the mapper 260. Rather, the writes W1 302*b* and W2 302*c* can be flushed and proceed as ordinary writes.

After recording the record 302*g* in the log, the RRF can issue a command or request to take a third transient or replication related snapshot, snap3, of the source volume V1. The request to take snap3 of V1 is recorded in the log as record 302*h*, where the transient flag (TF) is set for snap3 to signal to delay flushing the record 302*h*.

After recording 302*h* in the log, the storage system can receive write W5 recorded as entry 302*i* in the log. W5 can write to LBA E of V1. In at least one embodiment, the write record 302*i* would normally induce write splits in the mapper 260 if the record 302*h* taking snap3 were allowed to be flushed before the record W5 302*i*. In at least one embodiment of the low RPO replication technique, this can be avoided by delaying flushing of record 302*h* based on the transient flag TF.

After recording 302*i* in the log, the RRF can issue a command or request to delete the transient or replication related snapshot, snap2 of V1. Snap2 of V1 is the snapshot instance taken by the recorded command of the record 302*d*. The command to delete snap2 of V1 can be recorded in entry 302*j* of the log. At some later point in time, the logger can associate delete snap2 record 302*j* with the create snap2 record 302*d*, and invalidate the create snap2 record 302*d*. The result of such invalidation by logger would be to allow the write records W3 302*e* and W4 302*f* without inducing write splits in the mapper 260. Rather, the writes W3 302*e* and W4 302*f* can be flushed and proceed as ordinary writes.

As can be seen from FIG. 6 in at least one embodiment of the low RPO replication technique, sequences including creating and deleting multiple transient snapshots can be managed by invalidation by logger and delaying flushing of transient snapshots marked using the TF flag, which can avoid: creating any mappings (e.g., of metadata pages) for the snapshots, deleting the mappings for the snapshots, performing write splits when there is block sharing with the snapshots, and performing any needed cleanup after the write splits (e.g., deleting unneeded metadata supporting the write splits).

It should be noted that the example of FIG. 6 depicts an ordering in which the deletion of snap1 (302*g*) is placed before the creating of snap 3 (302*h*) thereby leaving snap2 as the only existing snapshot. In this example, the order or placement of delete snapshot commands and create snapshots commands is controlled by the RRF. In some embodiments, the RRF can have at least two transient snapshots at any given time. In this case, RRF can alternatively ensure a corresponding command sequence, for example, such that creating snap3 would alternatively occur prior to deleting snap1. In such an embodiment, there can be one replication cycle between two successive transient snapshots for which content is being replicated, and there can be another replication cycle that is open for which writes or data change are being tracked or collected.

Figure 7:
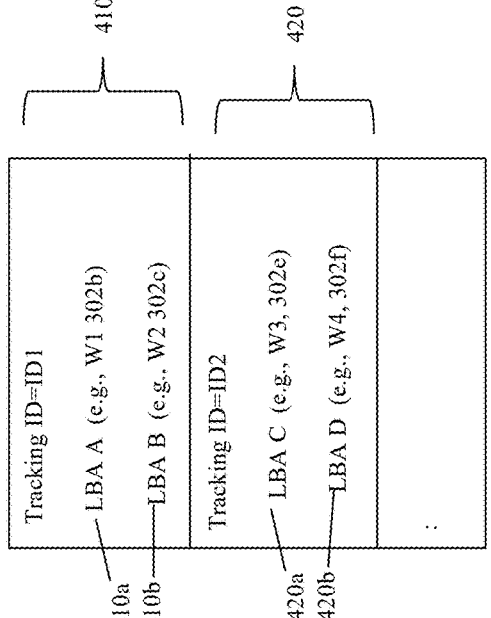
FIG. 7 is an example illustrating use of write tracking in at least one embodiment in accordance with the techniques of the present disclosure.

Referring to FIG. 7, shown is an example 400 of information that can be obtained as a result of write tracking in at least one embodiment of the low RPO replication technique in accordance with the techniques of the present disclosure.

In at least one embodiment, the cache or caching layer can perform write tracking of tagged writes where the cache can identify all writes tagged with a particular tracking identifier (ID). The particular tracking ID can uniquely identify a particular replication cycle between two successive snapshots of a source volume, and all writes tracked with the particular tracking ID can denote the data changes in the replication cycle. Put another way, writes can be tracked in a particular tracking session denoted by the tracking ID where the tracking session tracks writes made between two successive transient snapshots N−1 and N. Additionally generally the writes tracked for the tracking session with the tracking ID denote the writes included in the snapshot N.

The information of 400 can be stored in the cache, such as a volatile memory cache. The information of 400 can include a list of changes to the source volume V1 between successive transient or replication related snapshots taken by RRF. In at least one embodiment, each tracking ID can uniquely identify a corresponding replication cycle between two successive transient snaps. The example 400 includes tracked writes for 2 replication cycles, where each replication cycle can denote data changes or writes made to V1 between two successive transient snapshots N−1 and N, and where such writes or data changes are included in the snapshot N.

In some instances, the cache or memory 400 used for write tracking can be referred to as write tracking memory or cache used in connection with tracking changed locations of volumes between successive snapshots of each such volume for use with the low RPO replication technique.

FIG. 6 illustrates a sequence of commands or operations recorded in the log including 3 commands or requests to take snapshots of V1. With reference back to FIG. 6, let a tracking ID=ID1 denote the data changes or writes included in a first replication cycle or tracking session between snap1 of V1 and snap2 of V1; and let a tracking ID=ID2 denote the data changes or writes included in a second replication cycle or tracking session between snap2 of V1 and snap3 of V1. Based on the foregoing in this example, writes or data changes tracked with tracking ID=ID1 can be those writes made to V1 during the time interval between taking snap1 of V1 and snap 2 of V1. Additionally, writes or data changes tracked with tracking ID=ID2 can be those writes made to V1 during the time interval between taking snap2 of V1 and snap 3 of V1.

The example 400 of FIG. 7 includes element 410 denoting tracked writes tagged with tracking ID=ID1 identifying those writes or data changes made to V1 in the first replication cycle or tracking session between snap1 and snap2 of V1. The element 410 includes: LBA A 410*a* corresponding to the write W1 302*b*, and LBA B 410*b* corresponding to the write W2 302*c*, where such writes W1 and W2 occur between taking snap 1 (302*a*) and snap2 (302*d*), and where such writes W1 and W2 can be tagged with the tracking ID=ID1.

The example 400 includes element 420 denoting tracked writes tagged with tracking ID=ID2 identifying those writes or data changes made to V1 in the second replication cycle or tracking session between snap2 and snap3 of V1. The element 420 includes: LBA C 420*a* corresponding to the write W3 302*e*; and LBA D 410*b* corresponding to the write W4 302*f*, where such writes W3 and W4 occur between taking snap2 (302*d*) and snap 3 (302*h*), where such writes W3 and W4 can be tagged with the tracking ID=ID2.

For a replication cycle or tracking session having a corresponding tracking ID with the low RPO replication technique, RRF can determine the list of locations of data changes or writes having associated content to be replicated in the replication cycle or tracking session by querying the cache for all tracked writes having the corresponding tracking ID. For example, RRF can perform processing to determine the list or set of locations of data changes in the first replication session by querying the cache for all tracked writes having the tracking ID of ID1. In response, the cache can return to RRF a list of LBAs or offsets, and associated lengths, of tracked writes of V1 having the tracking ID of ID1. In this example, the cache can determine that the LBA A 410*a* and LBA B 410*b* of V1 have been written to or modified during the first replication cycle or tracking session between snap1 and snap2.

Thus the RRF can determine a first set of data changes to be replicated from the source system to the target system by querying the cache for locations of V1 of tracked writes having the tracking ID=ID1, and then obtaining the data written to such locations, such as LBA A and LBA B of V1, during the corresponding replication cycle. In response to the query for tracked writes associated with tracking ID=ID1, the cache can return to RRF a list of LBA A and LBA B. In at least one embodiment, the content or data written by W1 to LBA A and by W2 to LBA B during the corresponding replication cycle can be retained in the cache until replicated. Thus, RRF can read, from the cache, the write data of LBA A (W1) and LBA B (W2) to be replicated. Once the write data of LBA A and LBA B has been replicated, write data of LBA A and LBA B, as stored in the cache, can be candidates for eviction or removal from the cache. The first set of data changes or differences denotes the locations of V1 that have been modified or written during the corresponding replication cycle between snaps 1 and 2 of V1.

RRF can perform processing to determine the list or set of locations of data changes in the second replication session by querying the cache for all tracked writes having the tracking ID of ID2. In response, the cache can return to RRF a list of LBAs or offsets, and associated lengths, of tracked writes of V1 having the tracking ID of ID2. In this example, the cache can determine that the LBA C 420*a* and LBA D 420*b* of V1 have been written to or modified during the second replication cycle or tracking session between snap2 and snap3 of V1.

Thus the RRF can determine a second set of data changes to be replicated from the source system to the target system by querying the cache for locations of V1 of tracked writes having the tracking ID=ID2, and then obtaining the data written to such locations, such as LBA C and LBA D of V1 during the corresponding replication cycle. In response to the query for tracked writes associated with tracking ID=ID2, the cache can return to RRF a list of LBA C and LBA D of V1. In at least one embodiment, the content or data written by W3 to LBA C and by W4 to LBA D during the corresponding replication cycle can be retained in the cache until replicated. Thus, RRF can read, from the cache, the write data of LBA C (W3) and LBA D (W4) of V1 to be replicated. Once the write data of LBA C and LBA D of V1 has been replicated, write data of LBA C and LBA D, as stored in the cache, can be candidates for eviction or removal from the cache. The second set of data changes or differences denotes the locations of V1 that have been modified or written to during the corresponding second replication cycle between snaps 2 and 3 of V1.

Thus in at least one embodiment, low RPO replication processing can include efficiently determining the set or list of changed locations of V1 for a particular replication cycle by querying the cache for the list. Additionally, low RPO replication processing can include efficiently obtaining the content of such changed locations by then reading the content of such changed locations from cache where such content can be retained and can remain in the cache until replicated.

Thus generally in at least one embodiment, asynchronous replication as performed using the low RPO replication techniques described herein can utilize multiple optimization to achieve very low RPOs, such as RPOs that are less than 30 seconds. Such multiple optimizations in at least one embodiment are described elsewhere herein and can include: write tracking; retaining records of the transient snapshots are recorded in the log until deleted; and retaining data to be replicated in cache until replicated.

Referring to FIGS. 8A and 8B, shown is a flowchart 500, 501 of processing steps that can be performed in at least one embodiment of the low RPO replication technique. The steps of FIGS. 8A and 8B describe a sequence of processing steps that can be performed based on the example of FIGS. 6 and 7.

In the step 502, a stretched volume LUN A can be configured for asynchronous replication from a volume pair, V1, V2, where V1 is a source volume on a source storage system and where V2 is a target volume on a target storage system. The asynchronous replication can be performed by the RRF of the source system, where RRF can perform low RPO replication. From the step 502, control proceeds to the step 504.

At the step 504, RRF sends a command or request to create snap 1 of V1 resulting in recording entry 302*a* in the log. From the step 504, control proceeds to the step 506.

At the step 506, the storage system receives writes W1 and W2 directed to V1 resulting in recording entries 302*b-c* in the log. From the step 506, control proceeds to the step 508.

At the step 508, RRF sends a command or request to create snap2 of V2 resulting in recording entry 302*d* in the log. From the step 508, control proceeds to the step 510.

At the step 510, the storage system receives writes W3 and W4 directed to V1 resulting in recording entries 302*e-f* in the log. From the step 510, control proceeds to the step 512.

At the step 512, RRF computes the list or set of changed locations to V1 during the replication cycle or tracking session with tracking ID=ID1 thereby denoting the replication cycle between snap1 of V1 and snap2 of V1. RRF can determine the list by querying the cache for the list of tracked writes with tracking ID=ID1. In response, the cache can return the list of changed locations or LBAs of V1 written to or modified during the replication cycle between snap1 and snap2 where such tracked writes are tagged with tracking ID=ID1. In this example, the changed locations can be LBA A and LBA B of V1. RRF can determine a delta set of data differences or changes between snap1 and snap2 by reading from cache the contents of LBAs A and B of V1 as written during the corresponding replication cycle. The data changes of the delta set, including contents of LBAs A and B of V1 as written during the corresponding replication cycle, can be replicated from the source system to the target system and applied to the target volume V2. At this point, cache locations storing contents of LBAs A and B of V1 are no longer retained in cache and can be candidates for removal or eviction. From the step 512, control proceeds to 514.

At the step 514, RRF issues a command to delete snap1 of V1. The logger can respond to the delete command by invalidating and thus canceling the corresponding create snap1 command of record 302*a*. Invalidating snap1 302*a* allows writes W1 (302*b*) and W2 (302*c*) to be flushed.

Invalidating snap1 302*a* allows the create snap1 record 302*a* and delete snap1 record 302*g* to be canceled so that flushing can simply ignore records 302*a* and 302*g* without involving mapper (e.g., without inducing write splits, and without creating or deleting metadata for the snapshot or writes W1, W2). From the step 514, control proceeds to the step 516.

At the step 516, RRF sends a command or request to create snap 3 of V1 resulting in recording entry 302*h* in the log. From the step 516, control proceeds to the step 518.

At the step 518, the storage system receives write W5 directed to V1 resulting in recording entry 302*i* in the log. From the step 518, control proceeds to the step 520.

At the step 520, RRF computes the list or set of changed locations to V1 during the replication cycle or tracking session with tracking ID=ID2 between snap2 and snap3. RRF can determine the list by querying the cache for the list of tracked writes with tracking ID=ID2. In response, the cache can return the list of changed locations of LBAs of V1 written to or modified during the replication cycle between snap2 and snap3, where such locations are associated with tracked writes having tracking ID=ID2. In this example, the changed locations can be LBA C and LBA D of V1. RRF can determine a delta set of data differences or changes between snap2 and snap3 by reading from cache the contents of LBAs C and D of V1 as written during the corresponding replication cycle. The data changes of the delta set, including contents of LBAs C and D of V1, can be replicated from the source system to the target system and applied to the target volume V2. At this point, cache locations storing contents of LBAs C and D of V1 are no longer retained in cache (e.g., are not guaranteed to remain in cache) and can be candidates for cache removal or eviction. From the step 520, control proceeds to the step 522.

At the step 522, RRF issues a command to delete snap2 of V1. The logger can respond to the delete command by invalidating and thus canceling the corresponding take snap2 command of record 302*d*. Invalidating snap2 302*d* allows writes W3 (302*e*) and W4 (302*f*) to be flushed. Invalidating snap2 302*d* allows the records 302*d* and 302*j* to be canceled so that flushing can simply ignore records 302*d* and 302*j* without involving mapper (e.g., without inducing write splits, and without creating or deleting metadata for the snapshot or writes W3,W4).

The foregoing describes various optimizations that can be performed in connection with low RPO replication techniques for asynchronous replication in at least one embodiment. As can be observed from the foregoing discussions, the low RPO replication techniques use cache resources and log resources. In at least one embodiment, the cache resources can include volatile memory cache resources and the log resources can include non-volatile or persistent storage used for the persisted log. As the I/O load on the volumes under asynchronous replication using the low RPO techniques increases and/or as the number of volumes under asynchronous replication using the low RPO techniques increases, the available or free cache and log resources can run low such as below corresponding minimum thresholds. Due to the low levels of free cache and log resources, at least some volumes configured for low RPO replication can fall out of compliance such that low RPO replication ceases/is unable to be performed and an alternative asynchronous replication technique is performed for such volumes.

Consistent with discussion above, at least one embodiment of the low RPO replication technique relies on the ability to track every write to a volume to maintain a list of changed locations of the source volumes between successive transient or replication related snapshots (e.g., such as illustrated in the write tracking memory or cache of FIG. 7). If the write tracking memory or cache resource becomes depleted or exhausted (e.g., consumed so that no additional writes can be tracked), all further writes to all low RPO replication volumes will no longer be tracked such that all such volumes can fall back to use an alternative asynchronous replication technique or mode. In at least one embodiment, the alternative asynchronous replication technique may not perform any of the asynchronous replication optimizations performed by the low RPO replication technique. As such, the alternative asynchronous replication technique may not use or consume the write tracking memory or cache resource.

To avoid depleting the write tracking memory consumed collectively by all volumes configured for low RPO replication, the techniques of the present disclosure provide for monitoring the total amount of write tracking memory or cache consumed collectively across all volumes in connection with low RPO replication. In at least one embodiment, when the total amount of write tracking memory consumed exceeds a high water mark threshold, processing can be performed to pre-emptively and proactively demote selected one or more volumes from the low RPO replication technique or mode to the alternative asynchronous replication technique or mode. In at least one embodiment, the alternative asynchronous replication technique or mode can be the legacy snapshot difference technique discussed in more detail elsewhere herein that does not utilize the optimizations of the low RPO replication technique. In at least one embodiment, the legacy snapshot difference technique does not consume or use write tracking memory that is consumed or used in connection with the low RPO replication technique or mode.

In at least one embodiment with the legacy snapshot difference technique, the snapshot difference can be determined between successive two snapshots that have been created and thus flushed from the log to mapper. In this manner with the legacy snapshot difference technique, metadata has been created by mapper for the two transient snapshots and any writes applied to the source volume can result in performing write split processing as noted elsewhere herein that includes allocating/creating one or more new metadata pages for use with the snapshots as writes are applied to the source volume. The legacy snapshot difference technique can include determining the data differences between the two successive snapshots by traversing the metadata pages corresponding to each snapshot. Thus the legacy snapshot difference technique is generally more time consuming than determining the difference between two successive snapshots using the tracked writes in the low RPO technique. In at least one embodiment, the legacy snapshot technique or alternative technique performed when in the off service level can be expected to consume less cache resources and/or log resources than the low RPO technique. With the legacy snapshot difference technique, deleting the transient or replication related snapshots can also be more time consuming and can include performing expensive metadata page updates and/or deletion of metadata pages.

It should be noted that the low RPO replication technique and legacy snapshot difference technique can both generally determine the differences or changes between successive snapshots of a volume. However, as discussed herein in at least one embodiment, the low RPO replication technique uses resources, such as the write tracking cache, and performs optimizations that are otherwise omitted by the legacy snapshot technique such that the low RPO replication technique is able to achieve much lower RPOs than the legacy snapshot technique. When consumption of a resource, such as the write tracking cache, used by the low RPO replication technique exceeds a high water mark threshold in at least one embodiment, the techniques of the present disclosure can be utilized to select one or more volumes for demotion to the alternative asynchronous replication technique that does not consume or utilize write tracking cache. Thus in at least one embodiment, the low RPO replication technique can provide for much lower RPOs due to the optimizations and corresponding additional resource consumption. In contrast, the alternative asynchronous replication technique such as the legacy snapshot difference technique may not be able to provide such low RPOs but the alternative technique may also consume lesser amounts of system resources such as cache and/or log resources in comparison to the low RPO replication technique.

In at least one embodiment, processing can be performed to monitor the total amount of write tracking cache or memory consumed collectively in connection with performing low RPO replication across all respective configured volumes. When the total amount of write tracking cache consumed exceeds a high water mark threshold, processing can be performed by the storage system to pre-emptively demote one or more selected volumes currently using low RPO replication to use an alternative asynchronous replication technique such as the legacy snapshot difference technique. In at least one embodiment, a specified amount of cache or memory can be designated and configured as the write tracking memory or cache. Thus in at least one embodiment, the size of the write tracking memory or cache can be a designated, reserved and/or allocated portion of volatile memory in a system and/or each node of a system. The write tracking memory or cache resource can be depleted or exhausted when all of the allocated, reserved or designated memory of the write tracking memory is consumed in connection with low RPO replication (e.g., there is no free write tracking memory of the allocated portion available for use or consumption by the low RPO replication technique).

In at least one embodiment, the techniques of the present disclosure provide for pre-emptively selecting one or more volumes for demotion from the low RPO replication mode or technique prior to exhausting the write tracking memory which would case all volumes to cease use of the low RPO replication mode and use an alternative asynchronous replication mode, such as the legacy snapshot difference technique. Thus rather than have all volumes using the low RPO replication mode fall out of RPO compliance by not maintaining the low RPO replication mode and corresponding very low target RPOs such as less than 30 seconds, the techniques of the present disclosure provide for selectively demoting a subset of the volumes rather than have all volumes using the low RPO replication mode fall out of RPO compliance. For a simple example, assume there are 10 volumes performing asynchronous replication using the low RPO replication technique or mode and the write tracking memory is depleted. In this scenario, low RPO replication ceases for all 10 volumes and asynchronous replication for the 10 volumes can transition to using an alternative technique such as the legacy snapshot difference technique or mode. As a variation using the techniques of the present disclosure, the total amount of write tracking cache consumed in connection with performing low RPO replication for all 10 volumes can be monitored. Prior to depleting all of the write tracking cache, if the total amount consumed is above a specified threshold such as the high water mark discussed elsewhere herein, then the techniques of the present disclosure in at least one embodiment can provide for selecting a subset, such as one or two, of the 10 volumes for demotion from the low RPO replication mode to use the alternative technique. In this manner in at least one embodiment, the techniques of the present disclosure provide for selectively choosing one or some of the volumes for demotion while allowing the remaining volumes to continue with the low RPO replication mode.

What will now be described are factors or criteria that can be used in at least one embodiment in connection with selecting one or more volumes for demotion from the low RPO replication technique.

In at least one embodiment, the criteria or factors can include an assigned per volume priority. Each volume configured for low RPO replication can have an assigned priority. In at least one embodiment, the assigned priority can be a user assigned priority that is one of a set of predefined priorities. Generally, the set can have any suitable number of priorities although 3 is described below in at least one embodiment. The assigned priority for a volume can denote a priority or level of importance for maintaining RPO compliance using the low RPO replication technique for the volume. In at least one embodiment, there can be 3 predefined priorities of the set including: high, medium and low, where high denotes the highest relative priority of the set, and low denotes the lowest relative priority of the set. Generally in at least one embodiment, the priorities of the set can be ranked, from highest to lowest, as follows: high, medium and low. Volumes assigned the high priority can denote those volumes for which it is most important, with respect to all other volumes and respective lower priorities, to maintain a specified RPO target or goal. Volumes assigned the low priority can denote those volumes for which it is least important, with respect to all other volumes and higher priorities, to maintain a specified RPO target or goal. In this manner in at least one embodiment, volumes having a relatively lower assigned priority can be selected for demotion from low RPO replication before other volumes having a relatively higher assigned priority. For example, it can be more acceptable to have a low priority volume fall out of RPO compliance such that low RPO replication is not performed (e.g., and the low priority volume has a measured RPO exceeding a specified target or goal) than another medium or high priority volume.

In at least one embodiment, the criteria or factors can include an indicator of whether a volume is a member of a volume group. Generally, a volume group can be a logically defined group of two or more volumes. In at least one embodiment, the volume group (or more generally group) can include two or more stretched volumes or objects. In at least one embodiment, taking a snapshot such as a transient or replication related snapshot of a volume group in connection with asynchronous replication can include taking a snapshot of all of the source volumes of the volume group at the same point in time. Thus in at least one embodiment, asynchronous replication with respect to a volume group can include taking successive transient volume group level snapshots of all source volumes of the volume group and replicating the writes or changes between successive volume group snapshots to the target system for application to the corresponding target volumes of the volume group.

In at least one embodiment, the group level snapshot can provide for taking a snapshot of all group members and providing for write order consistency among all snapshots of group members. Volumes in the volume group maintain such consistency even on the destination or target system and therefore can be replicated with the same RPO. In this manner, it can be advantageous to perform asynchronous replication for all volumes in a volume group in the low RPO replication mode or technique. In at least one embodiment, a single stretched volume that is not included in a volume group can be identified as a better candidate for demotion rather than a volume included in a volume group. In at least one embodiment, for a volume group that is in hybrid or mixed mode, a remaining member volume M1 of the volume group where M1 is still in the low RPO replication mode can be a better candidate for demotion than another volume of a second volume group that is not in hybrid or mixed mode. In at least one embodiment, a volume group in hybrid or mixed mode is one in which i) at least a first member volume has asynchronous replication performed using the low RPO replication technique or mode and ii) at least a second member volume has asynchronous replication performed using an alternative technique such as the legacy snapshot difference technique. Thus with the hybrid or mixed mode volume group, members of the volume group are currently operating with mixed asynchronous replication techniques or modes. Put another way, with a hybrid or mixed mode volume group, one or more members are currently operating with asynchronous replication using the low RPO replication technique or mode, and one or more other members have been demoted from the low RPO replication technique or mode and are currently using an alternative asynchronous replication technique such as the legacy snapshot difference technique.

In at least one embodiment, a volume group operating in hybrid or mixed mode can provide for taking recovery snapshots of all volumes in the volume group at a same point in time with the same RPO. In at least one embodiment, a volume group in hybrid mode can take recovery snapshots at the same point in time of all member (source) volumes such as every 5 minutes. In at least one embodiment, the particular source volumes of the hybrid volume group operating in low RPO replication mode can continue to take additional individual volume replication-related snapshots in accordance with the low RPO replication mode or technique. In this manner, the low RPO replication mode can continue for individual member volumes of a hybrid volume group.

In at least one embodiment, the criteria or factors can include, for each volume having asynchronous replication performed using the low RPO replication technique, the amount of write tracking memory consumed for tracking writes for the particular volume. The amount of write tracking memory consumed for a particular volume can be an indication of the number of writes the volume has taken on since the last transient or replication related snapshot was taken. If the transient snapshot has not been flushed, then the amount of write tracking memory can be indicative of an amount of dirty data for the volume being held in cache and the log. When a volume is demoted from low RPO replication to an alternative technique such as the legacy snapshot difference technique, the write tracking memory consumed or used for the volume can be released back into the pool of available or free write tracking memory. Also in at least one embodiment for the volume demoted, dirty data for the volume can be flushed from the log to further relieve pressure on the cache and log.

In at least one embodiment, the priority assigned to respective volumes can be a starting point in connection with processing to select volumes for demotion from low RPO replication. In at least one embodiment, volumes can be segregated or partitioned into groups by assigned priority.

When the amount of write tracking memory free or available is below a specified amount of free write tracking memory, or alternative when the write tracking memory consumed or used is above a specified amount such as a high water mark, processing can be performed to demote one or more selected volumes. In at least one embodiment, volumes within a particular priority level can be sorted, from highest to lowest, based on their current respective write tracking memory consumption per volume. Volumes within a priority level grouping can be considered for demotion based on the highest to lowest sorted order with respect to current respective write tracking memory consumption per volume.

In at least one embodiment, processing for selecting volumes for demotion can start with the lowest priority volumes that are consuming the most write tracking memory. Volume group membership can be considered. In at least one embodiment, a volume that is either i) not part of a volume group or ii) part of a group in hybrid mode (e.g., already having at least one volume demoted) can be selected for demotion over a second volume that is part of a second volume group where all group members are in the low RPO replication mode (e.g., where the second volume group is not in hybrid mode). If, after processing the low priority volumes the write tracking memory consumed is still above a low watermark, additional volumes can be demoted that are assigned the medium and/or high priority. At this point, processing can be performed to evaluate medium and high priority volumes in a manner similar to that as described for low priority volumes.

Figure 9:
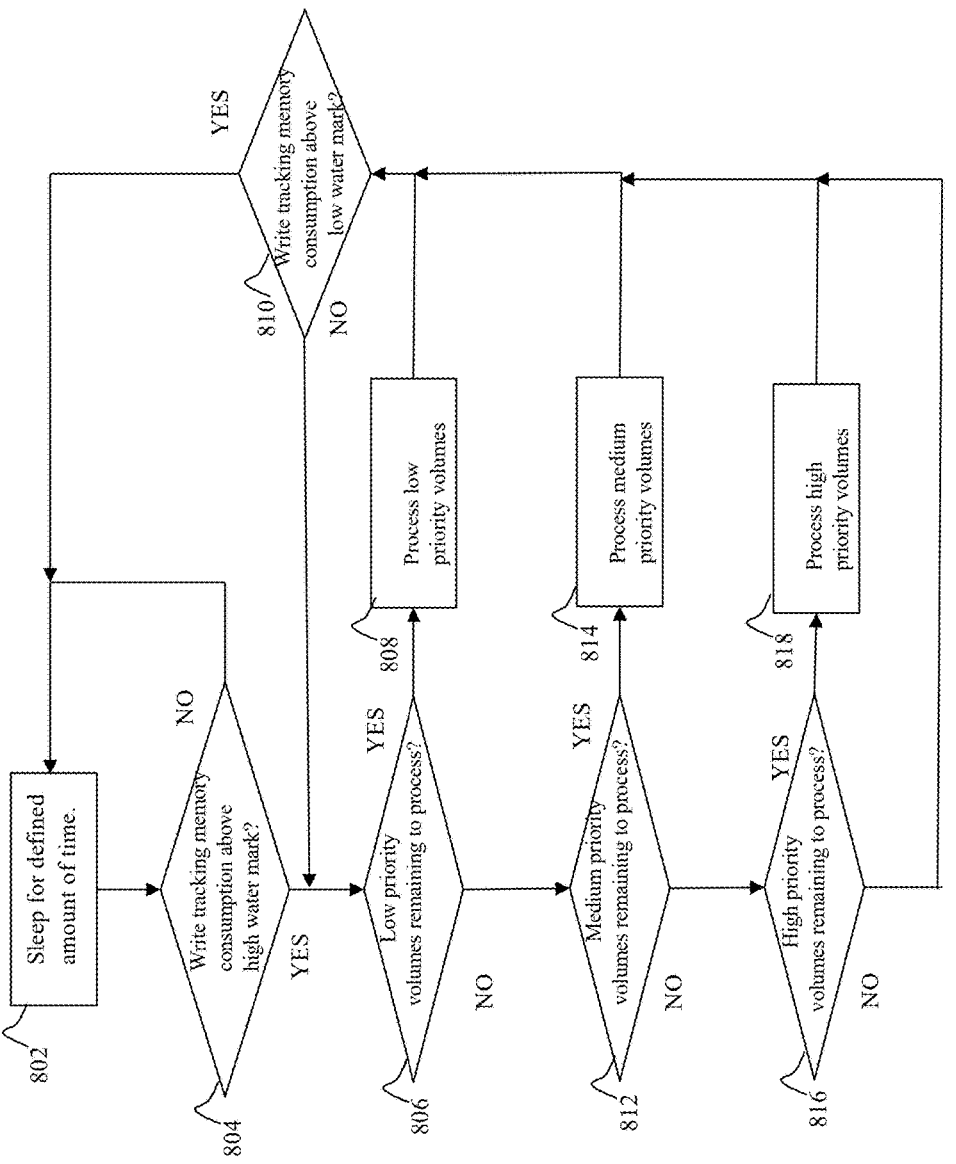

Described below in connection with FIGS. 9 and 10 are flowcharts of processing steps that can be performed in at least one embodiment in accordance with the techniques of the present disclosure. The processing of FIGS. 9 and 10 further describe processing mentioned above in connection with selecting volumes for demotion from the low RPO replication technique or mode to a second alternative replication technique or mode, such as the legacy snapshot difference technique.

Referring to FIG. 9, shown is a first flowchart 800 of processing steps that can be performed in at least one embodiment in accordance with the techniques of the present disclosure.

At the step 802, the process, thread or other code entity performing the processing to select volumes for demotion can sleep for a defined amount of time. In at least one embodiment, the amount of time can be 100 milliseconds. More generally, any suitable amount of time can be used to denote the periodic evaluation and processing performed in connection with FIGS. 9 and 10. From the step 802, control proceeds to the step 804.

At the step 804, a determination is made as to whether the total amount of write tracking memory consumed across all volumes operating with asynchronous replication in the low RPO replication mode or technique is above a high water mark or threshold. If the step 804 evaluates to no, control proceeds to the step 802. If the step 804 evaluates to yes, control proceeds to the step 806.

At the step 806, a determination is made as to whether there are any remaining low priority volumes to process for potential demotion from the low RPO replication mode. If the step 806 evaluates to yes, control proceeds to the step 808 to process one or more of the low priority volumes as candidates for demotion. Additional detail of the step 808 that can be performed in at least one embodiment is discussed in connection with FIG. 10 in following paragraphs. From the step 808, control proceeds to the step 810.

At the step 810, a determination is made as to whether the total amount of write tracking memory consumed across all volumes operating with asynchronous replication in the low RPO replication mode or technique is above a low water mark or threshold. In at least one embodiment, the low water mark or threshold can be any suitable value lower than the high water mark or threshold used in connection with the step 804.

If the step 810 evaluates to yes, it means that a sufficient amount of write tracking memory has been freed. If the step 810 evaluates to yes, control proceeds to the step 802. If the step 810 evaluates to no, control proceeds to the step 806 to continue to evaluate other candidate volumes for demotion from the low RPO replication mode or technique.

If the step 806 evaluates to no, meaning there are no remaining low priority volumes to consider as candidates for demotion, control proceeds to the step 812.

At the step 812, a determination is made as to whether there are any medium priority volumes remaining to process for potential demotion from the low RPO replication mode. If the step 812 evaluates to yes, control proceeds to the step 814 to process one or more medium priority volumes as candidates for demotion. Additional detail of the step 814 that can be performed in at least one embodiment is discussed in connection with FIG. 10 in following paragraphs. From the step 814, control proceeds to the step 810. If the step 812 evaluates to no, control proceeds to the step 816.

At the step 816, a determination is made as to whether there are any high priority volumes remaining to process for potential demotion from the low RPO replication mode. If the step 816 evaluates to yes, control proceeds to the step 818 to process one or more medium priority volumes as candidates for demotion. Additional detail of the step 818 that can be performed in at least one embodiment is discussed in connection with FIG. 10 in following paragraphs. From the step 818, control proceeds to the step 810. If the step 816 evaluates to no, control proceeds to the step 810.

Although FIG. 9 processing is described with reference to a particular embodiment with 3 defined priorities of high, medium and low discussed above, more generally the processing of FIG. 9 can be performed with respect to any suitable number of defined priorities.

In at least one embodiment to avoid an infinite loop of the processing of FIG. 9, processing can count the number of times, N, the step 816 evaluates to no without demoting any volumes in connection with the steps 808, 814 and 818. If the number of times, N, exceeds MAX, a specified maximum number of iterations, such as 2, processing of FIG. 9 can terminate or stop. In at least one embodiment, if the N exceeds MAX, one or more other actions can be performed.

In at least one embodiment, if N exceeds MAX, there is still an insufficient level of free write tracking memory (e.g., where step 810 evaluates to no) and yet there are no remaining volumes of any priority to further evaluate or consider for demotion. Thus, the total amount of write tracking memory can be consumed or depleted. As a result, one or more other actions can be taken. In at least one embodiment if N exceeds MAX, the one or more actions can include performing any one or more of:

i) Sending a message or notification to the system administrator regarding the state of the system. (The state of the system can denote that there are no remaining candidate volumes to evaluate for demotion, in accordance with one or more specified criteria, from the low RPO replication mode or technique. The message or notification can include a warning that additional volumes currently operating with the low RPO replication mode or technique for asynchronous replication can fall out of compliance and may be automatically demoted to use an alternative asynchronous replication mode or technique if the write tracking memory or cache becomes completely consumed or depleted.) and ii) Automatically increasing the amount or size of the write tracking memory cache available for consumption in connection with the low RPO replication mode or technique. (As a variation of ii) in at least one embodiment, the size of the write tracking memory can be increased after a) notifying a system administrator regarding the action to increase the size of the write tracking memory or cache for the low RPO replication mode; and b) receiving an indication or authorization from the system administrator to proceed. The indication or authorization can be, for example, a user specified input from a user interface such as a graphical user interface (GUI). In at least one embodiment, the resulting revised increased size or amount of write tracking memory allocated for use with the low RPO replication mode can also be any of: a default value or a user-specified amount such as an input from the system administrator in connection with the indicator or authorization to increase the size.)

An embodiment in accordance with the techniques of the present disclosure can also more generally perform any suitable action in connection with the one or more actions performed responsive to determining that N exceeds MAX.

Referring to FIG. 10, shown is a second flowchart 900 of a of processing that can be performed in at least one embodiment in accordance with the techniques of the present disclosure.

The steps of FIG. 10 can be performed to evaluate candidate volumes within each single one of the priorities. For example in at least one embodiment, the steps of FIG. 10 can be performed in connection with processing or evaluating the low priority volumes in the step 808 of FIG. 9; the steps of FIG. 10 can be performed in connection with processing or evaluating the medium priority volumes in the step 814 of FIG. 9; and the steps of FIG. 10 can be performed in connection with processing or evaluating the high priority volumes in the step 818 of FIG. 9.

At the step 902, processing is commenced to process or evaluate volumes for demotion within a single one of the priorities, PR1. From the step 902, control proceeds to the step 904.

At the step 904, processing is performed to sort volumes assigned priority PR1 by per volume write tracking memory consumption. The volumes can be sorted from high to low based on the per volume write tracking memory consumption, where the sorted volumes can be included in a list. In this manner, subsequent steps of FIG. 10 can evaluate volumes of the particular priority PR1 based on decreasing amounts of write tracking memory consumed per volume. In such an embodiment, tracking can be performed to track the current amount of write tracking memory or cache consumed by each volume operating with asynchronous replication in the low RPO replication mode or technique. From the step 904, control proceeds to the step 906.

At the step 906, the variable current volume, CV, can be assigned the next volume on the sorted list. In at least one embodiment, CV is assigned in the step 906 to the next candidate volume having the highest per volume write tracking consumption of all remaining candidates of the list yet to be processed or evaluated in the current iteration of processing of FIG. 10. From the step 906, control proceeds to the step 908.

At the step 908, a determination is made as to whether CV is part of a volume group, denoted as VG. If the step 908 evaluates to yes, control proceeds to the step 910.

At the step 910, a determination is made as to whether the volume group VG to which CV belongs as a member is in hybrid or mixed mode. If the step 910 evaluates to no, control proceeds to the step 912. At the step 912, a determination is made as to whether there are any remaining volumes of the list to be evaluated as candidates for demotion. If the step 912 evaluates to yes, control proceeds to the step 906.

If the step 912 evaluates to no, control proceeds to the step 914. If the step 912 evaluates to no, it means that i) CV denotes a current volume included in a volume group that is currently not in hybrid mode; and ii) there are currently no remaining volumes in the list to consider for demotion. Put another way, at this point, there are only candidate volumes of intact or non-hybrid volume groups to demote where CV is one such candidate volume. As a result at this point, steps 914 and 916 can be performed to demote CV as the first volume of its corresponding volume group, where such demotion causes the corresponding volume group to transition into hybrid or mixed mode. At the step 914, the volume group VG's attribute or flag denoting whether VG is in hybrid mode can be modified to indicate that VG is in hybrid mode. From the step 914, control proceeds to the step 916 where CV is demoted from the low RPO replication mode or technique. Consistent with other discussion herein CV can be demoted in the step 916 from the low RPO replication mode or technique to a second alternative asynchronous replication mode or technique, such as the legacy snapshot difference technique, that does not use the write tracking memory or cache. In at least one embodiment, the second alternative replication mode or technique can more generally not perform any of the optimizations discussed herein with the low RPO replication mode or technique.

From the step 916, control proceeds to the step 918. At the step 918, processing can be performed to release one or more resources consumed by CV in connection with the low RPO replication mode. In at least one embodiment, the step 918 can include releasing or freeing write tracking memory or cache consumed by CV. In at least one embodiment, the step 918 can include marking as a candidate for eviction from cache any cache lines or locations storing content of CV for locations waiting to be replicated. More generally in at least one embodiment, the step 918 can include performing processing to release any resources consumed by the demoted CV in connection with the low RPO replication mode. For example, the step 918 can include allowing transient or replication related snapshots of CV to now be flushed from the log in efforts to also increase the available log space. As noted above, the step 918 can include allowing unreplicated content of CV to be flushed from source system cache prior to being replication to the target system.

If the step 910 evaluates to yes as a result of CV being included in the volume group VG that is already in hybrid mode, control proceeds to the step 916 to demote CV from the low RPO replication mode or technique.

If the step 908 evaluates to no as a result of CV not being part of a volume group, control proceeds from the step 908 to the step 916.

FIG. 10 processing described above illustrates processing performed for demoting a single volume of a particular priority. More generally, FIG. 10 processing can be repeated any suitable number of times for demoting a corresponding number of desired volumes. In at least one embodiment, FIG. 10 processing can be performed to demote a single volume of a particular priority, where subsequently, processing of FIG. 9 can be performed to evaluate whether to demote any additional volumes. In this latter embodiment, for example, any of the steps 808, 814 and 818 of FIG. 9 can be performed to generally demote a single volume before proceeding to the step 810 to re-evaluate the total amount of consumed write tracking memory. As a variation in at least one embodiment, any of the steps 808, 814 and 818 of FIG. 9 can be performed to generally demote a specified number of volumes NUM, where NUM≥1, before proceeding to the step 810 to re-evaluate the total amount of consumed write tracking memory.

Referring to FIG. 11, shown is a flowchart 1000 of processing steps that can be performed in at least one embodiment in accordance with the techniques of the present disclosure. The flowchart 1000 summarizes processing described above.

At the step 1002, processing can be performed to configure stretched volumes for asynchronous replication using the low RPO technique or mode and corresponding optimizations. From the step 1002, control proceeds to the step 1004.

At the step 1004, processing can monitor resource consumption of one or more resources consumed in connection with asynchronous replication using the low RPO technique. Monitoring can include monitoring consumption of write tracking cache or memory.

In the step 1004, monitoring can include determining whether the amount of free or unused write tracking cache is below a specified first threshold. If so, processing can be performed pre-emptively prior to depleting or exhausting the write tracking cache. The processing can include selecting, in accordance with criteria, one or more volumes that are demoted from the low RPO replication mode to an alternative replication mode or technique such as the legacy snapshot difference technique. Volumes can be demoted in efforts to increase the amount of free write tracking cache (and accordingly decrease the consumed or used amount of write tracking cache) until the amount of free or unused write tracking cache is above a specified second threshold, where the second threshold can be greater than the first threshold.

In the step 1004, monitoring can include determining whether the total amount of consumed write tracking cache is above a high watermark threshold. If so, processing can be performed pre-emptively prior to depleting or exhausting the write tracking cache. The processing can include selecting, in accordance with criteria, one or more volumes that are demoted from the low RPO replication mode to an alternative replication mode or technique such as the legacy snapshot difference technique. Volumes can be demoted in efforts to increase the amount of free write tracking cache (and accordingly decrease the consumed or used amount of write tracking cache) until the total amount of consumed write tracking cache is below a low watermark threshold, where the high watermark threshold can be greater than the low watermark threshold. From the step 1004, control proceeds to the step 1006.

At the step 1006, processing can promote or restore one or more of the volumes, previously demoted in the step 1004, to the low RPO replication mode. In at least one embodiment, volumes promoted or restored to operate in the low RPO replication mode can be performed in a step-wise manner. For example, no more than a specified quantity of demoted volumes can be promoted or restored to the low RPO replication mode at each occurrence of a specified time period. In this manner in at least one embodiment, previously demoted volumes can be promoted or restored in a step-wise manner.

Without using the techniques of the present disclosure to preemptively demote one or more volumes from low RPO replication, increased resource pressure from I/O load for low RPO replication can result in failure or inability to perform low RPO replication for many or all volumes. For such volumes for which low RPO replication mode can no longer be performed, the volumes can fall out of RPO compliance by not meeting specified low RPO targets achieved with the low RPO replication mode or technique. For such volumes for which low RPO replication can no longer be performed, an alternative slower replication mode or technique such as the legacy snapshot difference technique can be performed. In contrast, using the techniques of the present disclosure provides for pre-emptively and selectively choose one or more volumes demoted from the low RPO replication mode or technique in efforts to maintain a larger number of volumes in the low RPO replication mode as well as selecting particular volumes that are demoted. Without using the techniques of the present disclosure in at least one embodiment, depletion of the write tracking cache can cause all volumes to cease using the low RPO replication mode and use the alternative replication mode or technique thereby adversely impacting system performance. In at least one embodiment, the techniques of the present disclosure allow a more efficient distribution of resources across low RPO replication processing, and in cases of high resource utilization, allow the system to limit the adverse impact to a few demoted volumes. Using the techniques of the present disclosure in at least one embodiment can therefore limit the additional load placed on the system by allowing some volumes to continue to operate using the low RPO replication mode while demoting selected volumes to avoid depleting the write tracking cache or memory.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method comprising:
   configuring a plurality of stretched volumes for asynchronous replication, wherein each of the plurality of stretched volumes is configured from a source volume on a source system and a target volume on a target system, and where writes or data changes to the source volume are asynchronously replicated from the source system to the target system and applied to the target volume, wherein said configuring includes configuring the plurality of stretched volumes to perform asynchronous replication in a first mode using a first replication technique that performs one or more optimizations including a first optimization that uses a write tracking cache of the source system to track locations of each of the plurality of stretched volumes that are written between successive replication-related snapshots of respective source volumes of the plurality of stretched volumes;

performing asynchronous replication for the plurality of stretched volumes in accordance with the first replication technique; and monitoring resource consumption of the write tracking cache consumed during asynchronous replication processing in connection with the first replication technique, wherein said monitoring includes:

determining that a current amount of write tracking cache consumed exceeds a high watermark threshold; and responsive to determining that the current amount of write tracking cache consumed exceeds a high watermark threshold, performing first processing that selects, in accordance with criteria, one or more of the plurality of stretched volumes for demotion from the first replication mode, that uses the first replication technique, to a second replication mode that uses a second replication technique, wherein the second replication technique does not perform the first optimization and does not use the write tracking cache.

2. The computer-implemented method of claim 1, wherein said monitoring includes:
   demoting selected ones of the plurality of stretched volumes from the first replication mode, that uses the first replication technique, to the second replication mode, that uses the second replication technique, until the current amount of write tracking consumed is below a low watermark threshold, wherein the low watermark threshold is less than the high watermark threshold.

3. The computer-implemented method of claim 2, wherein the criteria include a set of priorities, and the method includes:
   assigning each of the plurality of stretched volumes a corresponding priority of the set.

4. The computer-implemented method of claim 3, wherein the set of priorities includes three priorities.

5. The computer-implemented method of claim 3, wherein the criteria include, for each of the plurality of stretched volumes, a corresponding indicator as to whether said each stretched volume is a member of a volume group.

6. The computer-implemented method of claim 5, wherein the criteria include, for each of the plurality of stretched volumes, a corresponding amount of the write tracking cache consumed in connection with performing asynchronous replication for said each stretched volume using the first replication technique of the first replication mode.

7. The computer-implemented method of claim 6, wherein the first processing includes:
   partitioning said plurality of stretched volumes into priority groups based on a respective one of the priorities of the set assigned to each of said plurality of stretched volumes, wherein the priorities of the set are ranked, from a highest priority level to a lowest priority level, and wherein each of the priority groups associated with a respective one of the priorities of the set includes a corresponding portion of the plurality of stretched volumes assigned said one priority.

8. The computer-implemented method of claim 7, wherein the first processing includes:

for each of the plurality of priority groups, sorting respective stretched volumes of said each priority group based on corresponding amounts of the write tracking cache consumed per stretched volume in connection with performing asynchronous replication using the first replication technique of the first replication mode, wherein said sorting generates, for said each priority group, a list of said each priority group's stretched volumes sorted based on decreasing respective amounts of the write tracking cache consumed in connection with performing asynchronous replication using the first replication technique of the first replication mode.

9. The computer-implemented method of claim 8, wherein the first processing includes:

evaluating said plurality of stretched volumes as candidates for demotion based, at least in part, on increasing priority levels associated with the priority groups.

10. The computer-implemented method of claim 9, wherein the set includes a first priority associated with a first group of the priority groups, wherein the first group includes a first list of stretched volumes that are i) assigned the first priority, and ii) sorted based on decreasing respective amounts of the write tracking cache consumed per stretched volume in connection with performing asynchronous replication using the first replication technique of the first replication mode.

11. The computer-implemented method of claim 10, wherein the first processing includes:

evaluating stretched volumes for demotion from the first replication mode based on the sorted order of the first list, said evaluating comprising:

determining a current volume as a next stretched volume of the first list;

determining whether the current volume is included in any volume group; and responsive to determining that the current volume does not belong to any volume group, performing second processing including:

demoting the current volume from the first replication mode to the second replication mode; and releasing a corresponding portion of the write tracking cache consumed in connection with the first replication mode for the current volume.

12. The computer-implemented method of claim 11, wherein said evaluating includes:

responsive to determining that the current volume belongs to a first volume group that is in hybrid mode, performing third processing including:

demoting the current volume from the first replication mode to the second replication mode; and releasing a corresponding portion of the write tracking cache consumed in connection with the first replication mode for the current volume.

13. The computer-implemented method of claim 12, wherein said evaluating includes:

responsive to determining that the current volume belongs to a second volume group that is not in hybrid mode, determining whether there is at least one remaining stretched volume on the first list that has not been evaluated; and responsive to determining that the current volume belongs to the second volume group that is not in hybrid mode and that there is at least one remaining stretched volume on the first list that has not been evaluated for demotion, performing fourth processing including:

determining not to demote the current volume; and evaluating a next stretched volume of the first list for demotion.

14. The computer-implemented method of claim 13, wherein said evaluating includes:

responsive to determining that the second volume group is not in hybrid mode and that there are no remaining stretched volumes on the first list to be evaluated for demotion, performing fifth processing including:

demoting the current volume from the first replication mode to the second replication mode; and releasing a corresponding portion of the write tracking cache consumed in connection with the first replication mode for the current volume.

15. The computer-implemented method of claim 1, wherein the second replication technique is a legacy snapshot difference technique.

16. A system comprising:

one or more processors; and a memory comprising code stored thereon that, when executed, performs a method comprising:

configuring a plurality of stretched volumes for asynchronous replication, wherein each of the plurality of stretched volumes is configured from a source volume on a source system and a target volume on a target system, and where writes or data changes to the source volume are asynchronously replicated from the source system to the target system and applied to the target volume, wherein said configuring includes configuring the plurality of stretched volumes to perform asynchronous replication in a first mode using a first replication technique that performs one or more optimizations including a first optimization that uses a write tracking cache of the source system to track locations of each of the plurality of stretched volumes that are written between successive replication-related snapshots of respective source volumes of the plurality of stretched volumes;

performing asynchronous replication for the plurality of stretched volumes in accordance with the first replication technique; and monitoring resource consumption of the write tracking cache consumed during asynchronous replication processing in connection with the first replication technique, wherein said monitoring includes:

determining that a current amount of write tracking cache consumed exceeds a high watermark threshold; and responsive to determining that the current amount of write tracking cache consumed exceeds a high watermark threshold, performing first processing that selects, in accordance with criteria, one or more of the plurality of stretched volumes for demotion from the first replication mode, that uses the first replication technique, to a second replication mode that uses a second replication technique, wherein the second replication technique does not perform the first optimization and does not use the write tracking cache.

17. A non-transitory computer-readable media comprising code stored thereon that, when executed, performs a method comprising:

configuring a plurality of stretched volumes for asynchronous replication, wherein each of the plurality of stretched volumes is configured from a source volume on a source system and a target volume on a target system, and where writes or data changes to the source volume are asynchronously replicated from the source system to the target system and applied to the target volume, wherein said configuring includes configuring the plurality of stretched volumes to perform asynchronous replication in a first mode using a first replication technique that performs one or more optimizations including a first optimization that uses a write tracking cache of the source system to track locations of each of the plurality of stretched volumes that are written between successive replication-related snapshots of respective source volumes of the plurality of stretched volumes;

performing asynchronous replication for the plurality of stretched volumes in accordance with the first replication technique; and monitoring resource consumption of the write tracking cache consumed during asynchronous replication processing in connection with the first replication technique, wherein said monitoring includes:

determining that a current amount of write tracking cache consumed exceeds a high watermark threshold; and responsive to determining that the current amount of write tracking cache consumed exceeds a high watermark threshold, performing first processing that selects, in accordance with criteria, one or more of the plurality of stretched volumes for demotion from the first replication mode, that uses the first replication technique, to a second replication mode that uses a second replication technique, wherein the second replication technique does not perform the first optimization and does not use the write tracking cache.

18. The computer-implemented method of claim 17, wherein said monitoring includes:

demoting selected ones of the plurality of stretched volumes from the first replication mode, that uses the first replication technique, to the second replication mode, that uses the second replication technique, until the current amount of write tracking consumed is below a low watermark threshold, wherein the low watermark threshold is less than the high watermark threshold.

19. The computer-implemented method of claim 18, wherein the criteria include a set of priorities, and the method includes:

assigning each of the plurality of stretched volumes a corresponding priority of the set.

20. The computer-implemented method of claim 19, wherein the criteria include, for each of the plurality of stretched volumes, a corresponding indicator as to whether said each stretched volume is a member of a volume group, and wherein the criteria include, for each of the plurality of stretched volumes, a corresponding amount of the write tracking cache consumed in connection with performing asynchronous replication for said each stretched volume using the first replication technique of the first replication mode.

\* \* \* \* \*